United States Patent
Kurasawa

(10) Patent No.: US 7,423,713 B2
(45) Date of Patent: Sep. 9, 2008

(54) LIQUID CRYSTAL DEVICE AND ELECTRONIC EQUIPMENT

(75) Inventor: Hayato Kurasawa, Matsumoto (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 467 days.

(21) Appl. No.: 11/324,347

(22) Filed: Jan. 4, 2006

(65) Prior Publication Data
US 2006/0215086 A1  Sep. 28, 2006

(30) Foreign Application Priority Data
Mar. 28, 2005 (JP) ............................ 2005-090720
Mar. 28, 2005 (JP) ............................ 2005-090721

(51) Int. Cl.
*G02F 1/1335* (2006.01)
(52) U.S. Cl. ................... 349/114; 349/96; 349/104; 349/113; 349/144; 349/143
(58) Field of Classification Search ................ 349/114, 349/113, 44, 146, 144, 143, 149, 67, 87, 349/104, 105, 106, 96, 97, 61
See application file for complete search history.

(56) References Cited

U.S. PATENT DOCUMENTS

| | | | |
|---|---|---|---|
| 6,008,871 A | 12/1999 | Okumura | |
| 6,512,560 B2 * | 1/2003 | Ohtake et al. | 349/114 |
| 6,765,636 B2 | 7/2004 | Iijima | |
| 6,842,205 B2 | 1/2005 | Kurasawa | |
| 6,862,054 B2 | 3/2005 | Kawakami | |
| 6,870,586 B2 * | 3/2005 | Iijima | 349/114 |
| 7,321,410 B2 * | 1/2008 | Iijima et al. | 349/114 |
| 2001/0046014 A1 * | 11/2001 | Ohtake et al. | 349/114 |
| 2006/0215086 A1 * | 9/2006 | Kurasawa | 349/114 |
| 2006/0274243 A1 * | 12/2006 | Iijima et al. | 349/114 |

FOREIGN PATENT DOCUMENTS

| | | | | |
|---|---|---|---|---|
| CN | 1188902 A | 7/1998 | ............. | 349/114 X |
| CN | 1474215 A | 2/2004 | ............. | 349/114 X |
| JP | A-2002-139737 | 5/2002 | | |
| JP | A-2002-182228 | 6/2002 | | |
| JP | A-2002-268042 | 9/2002 | | |
| JP | A 2003-131248 | 5/2003 | ............. | 349/114 X |
| JP | A-2003-330020 | 11/2003 | | |
| JP | A-2004-177672 | 6/2004 | | |
| JP | A-2004-245871 | 9/2004 | | |

\* cited by examiner

*Primary Examiner*—Brian M Healy
(74) *Attorney, Agent, or Firm*—Oliff & Berridge, PLC

(57) ABSTRACT

A semi-transmissive reflective liquid crystal device includes a first substrate, a second substrate disposed opposite to the first substrate, a liquid crystal layer disposed between the first substrate and the second substrate, a plurality of sub-pixel regions at which reflective display and transmissive display are performed, each of the sub-pixel regions being the smallest display unit, a first electrode and a second electrode disposed in each of the sub-pixel regions at the liquid crystal layer side of the first substrate for driving the liquid crystal layer by an electric field generated between the first electrode and the second electrode, and a reflective polarization layer disposed at the first substrate or the second substrate, the reflective polarization layer including a transmission axis and a reflection axis perpendicular to the transmission axis, for reflecting a portion of an incident light, which is a polarized light component parallel with the reflection axis, and transmitting the remainder of the incident light, which is a polarized light component parallel with the transmission axis.

20 Claims, 22 Drawing Sheets ic Field

The present invention relates to a liquid crystal device and electronic equipment.

LIQUID CRYSTAL DEVICE AND ELECTRONIC EQUIPMENT

BACKGROUND

1. Technical Field

The present invention relates to a liquid crystal device and electronic equipment.

2. Related Art

Liquid crystal devices that adopts a mode in which an electric field is applied to a liquid crystal layer in the substrate surface direction to control the orientation of liquid crystal molecules (hereinafter, referred to as "horizontal electric field mode") are known. Based on the shape of an electrode, which applies the electric field to the liquid crystal, the horizontal electric field mode is classified as in-plane switching (IPS) mode and fringe-field switching (FFS) mode. JP-A-2003-131248 is an example of related art.

Meanwhile, a semi-transmissive reflective liquid crystal device is adopted for the display part of a portable information terminal, such as a mobile phone, since the portable information terminal is used in various environments. For this reason, the inventor examined a semi-transmissive reflective liquid crystal device that is capable of driving the liquid crystal by a horizontal electric field, and found that the IPS mode or FFS mode liquid crystal device cannot perform semi-transmissive reflective display even though a reflective layer is partially disposed in pixel regions of the liquid crystal device.

SUMMARY

An advantage of some aspect of the invention is that it provides a horizontal electric field mode semi-transmissive reflective liquid crystal device that is capable of accomplishing high-quality display in both the reflective display and the transmissive display.

According to an aspect of the invention, a semi-transmissive reflective liquid crystal device, which performs reflective display and transmissive display in each sub-pixel region, includes a first substrate and a second substrate, which are opposite to each other while a liquid crystal layer is disposed between the first substrate and the second substrate, a first electrode and a second electrode disposed at the liquid crystal layer side of the first substrate such that an electric field is generated between the first electrode and the second electrode by voltage applied in each sub-pixel region, and the liquid crystal layer is driven by the electric field (the orientation of liquid crystal molecules is controlled), and a semi-transmissive reflective type reflective polarization layer disposed at the second substrate, the reflective polarization layer having a transmission axis and a reflection axis perpendicular to the transmission axis, for reflecting a portion of an incident light, which is a polarized light component parallel with the reflection axis, and transmitting the remainder of the incident light, which is a polarized light component parallel with the transmission axis.

According to the aspect of the invention, the liquid crystal device is a horizontal electric field mode liquid crystal device adopting an IPS mode in which an electric field generated between the first electrode and the second electrode disposed on the first substrate is applied to the liquid crystal layer approximately in the substrate surface direction to drive the liquid crystal. According to the aspect of the invention, the semi-transmissive reflective type reflective polarization layer is included in the liquid crystal device, and therefore, both the transmissive display and the reflective display are excellent while the structure of the horizontal electric field mode semi-transmissive reflective liquid crystal device is simplified. Also, according to the aspect of the invention, high-brightness, high-contrast display is accomplished in both the reflective display and the transmissive display without adopting a well-known multi-gap structure.

In the specification, a display region having the smallest display unit is referred to as "a sub-pixel region," since three sub-pixels, such as red (R), green (G), and blue (B), constitute a pixel, for example, in the case of a color liquid crystal display device. Also, "a reflective display region" disposed in the sub-pixel region is a region at which display is performed using a light incident from the display surface side of the liquid crystal display device, and "a transmissive display region" disposed in the sub-pixel region is a region at which display is performed using a light incident from the rear surface side (the side opposite to the display surface side) of the liquid crystal display device.

In accordance with an embodiment of the invention, the first electrode and the second electrode include pluralities of band-shaped electrodes extending in each sub-pixel region, respectively, and the band-shaped electrodes of the first electrode and the band-shaped electrodes of the second electrode are alternately arranged in each of the sub-pixel regions. Consequently, when voltage is applied between the first electrode and the second electrode, the liquid crystal in each sub-pixel region is oriented in the lateral direction of the band-shaped electrodes, and therefore, it is possible to easily widen a view angle of the display.

In accordance with an embodiment of the invention, the semi-transmissive reflective liquid crystal device further includes a polarization panel disposed at the surface of the second substrate at the side opposite to the reflective polarization layer. The polarization panel has a transmission axis, and the reflective polarization layer has a transmission axis. The transmission axis of the polarization panel is approximately parallel with the transmission axis of the reflective polarization layer. Consequently, the transmission rate/reflection rate of the light incident on the reflective polarization layer is maximized, and therefore, it is possible to accomplish bright display.

In accordance with an embodiment of the invention, the band-shaped electrodes of the first electrode and the band-shaped electrodes of the second electrode are approximately parallel with each other, and the extension direction of the band-shaped electrodes intersects the transmission axis of the reflective polarization layer.

Consequently, when voltage is applied between the electrodes, the direction in which the liquid crystal is oriented is dispersed in the substrate surface, and therefore, it is possible to easily widen a view angle of the display.

In accordance with an embodiment of the invention, the angle between extension direction of the band-shaped electrodes and the transmission axis of the reflective polarization layer is approximately 30 degrees. In the case that the angle is 30 degrees, the movable width of the liquid crystal is minimally controlled, when voltage is applied between the electrodes. Consequently, it is possible to increase the range of the view angle.

In accordance with an embodiment of the invention, the reflective polarization layer is partially formed in each sub-pixel region of the liquid crystal device. In this case, a portion of each sub-pixel region, at which the reflective polarization layer is partially formed, is a reflective display region, and the remainder of each sub-pixel region, at which the reflective polarization layer is not formed, is a transmissive display region. As a result, the transmissive display region and the reflective display region are clearly separated from each other. Consequently, the optical design is optimized for both the reflective display and the transmissive display, and therefore, picture quality of the liquid crystal device is further improved.

In accordance with an embodiment of the invention, the reflective polarization layer is almost wholly formed in each sub-pixel region. In this case, the reflective polarization layer partially transmits the polarized light component incident on the reflective polarization layer, and reflects a portion of the polarized light component. The reflective polarization layer may be formed in the shape of a plane in each sub-pixel region, and therefore, the manufacturing process is easily performed, and yield rate is increased. Also, the region can be widely used, and the optical design of the pixel is simple as compared to the case that each sub-pixel region is divided into the reflective display region and the transmissive display region.

In accordance with an embodiment of the invention, the reflective polarization layer includes a prism array, which is formed by arranging a plurality of prisms, and a dielectric interference film, which is formed on the prism array. In this case, the reflection rate and the transmission rate can be easily adjusted by the stacked structure of the dielectric interference film, and, especially, the reflective polarization layer is appropriately used in the structure in which the reflective polarization layer is wholly disposed in each sub-pixel region.

In accordance with an embodiment of the invention, the reflective polarization layer includes a metal reflective film having a plurality of openings, which are formed in the shape of a minute slit. In this case, the degree of polarization is high, and a patterning process is easily performed as compared to the structure in which the dielectric interference film is formed on the prism array. Consequently, the reflective polarization layer is appropriately used in the structure in which the reflective polarization layer is partially disposed in each sub-pixel region.

In accordance with an embodiment of the invention, the liquid crystal layer has a thickness approximately uniform in each sub-pixel region. In accordance with an embodiment of the invention, the liquid crystal device does not adopt the multi-gap structure, and therefore, the thickness of the liquid crystal layer is uniform in each sub-pixel region. Consequently, nonuniformity of the drive voltage in each sub-pixel region is prevented in the horizontal electric field mode liquid crystal device, in which the drive voltage is greatly changed depending upon the thickness of the liquid crystal layer, and therefore, high-quality transmissive display and reflective display are accomplished.

In accordance with an embodiment of the invention, the liquid crystal device further includes a color filter disposed on the reflective polarization layer of the second substrate. In this case, color difference in the reflective display is prevented, and the electric field applied to the liquid crystal layer is prevented from being affected by the reflective polarization layer when the reflective polarization layer is made of a conductive material. Consequently, it is possible to accomplish high-quality display.

In accordance with an embodiment of the invention, the liquid crystal device further includes an insulation film formed between the color filter and the liquid crystal layer. In this case, the influence on the liquid crystal layer caused when the when the reflective polarization layer is made of a conductive material is further decreased. Also, the surface of the color filter is evened by the insulation film, and therefore, the display characteristics due to the uniformity of the thickness of the liquid crystal layer are improved.

According to another aspect of the invention, a semi-transmissive reflective liquid crystal device, which performs reflective display and transmissive display in each sub-pixel region, includes a first substrate and a second substrate, which are opposite to each other while a liquid crystal layer is disposed between the first substrate and the second substrate, a first electrode formed in each sub-pixel region, an interlayer insulation film, which covers the first electrode, a second electrode formed on the interlayer insulation film, and a reflective polarization layer, the first electrode, the interlayer insulation film, the second electrode, and the reflective polarization layer being on the first substrate such that an electric field is generated between the first electrode and the second electrode by voltage applied in each sub-pixel region, and the liquid crystal layer is driven by the electric field (the orientation of liquid crystal molecules is controlled), the reflective polarization layer being a semi-transmissive reflective type reflective polarization layer, having a transmission axis and a reflection axis perpendicular to the transmission axis, for reflecting a portion of a light incident on the reflective polarization layer, which is a polarized light component parallel with the reflection axis, and transmitting the remainder of the light incident on the reflective polarization layer, which is a polarized light component parallel with the transmission axis.

According to the aspect of the invention, the liquid crystal device is a horizontal electric field mode liquid crystal device adopting an FFS mode in which an electric field generated between the first electrode and the second electrode is applied to the liquid crystal layer approximately in the substrate surface direction to drive the liquid crystal. According to the aspect of the invention, the semi-transmissive reflective type reflective polarization layer is included in the liquid crystal device, and therefore, both the transmissive display and the reflective display are excellent while the structure of the horizontal electric field mode semi-transmissive reflective liquid crystal device is simplified. Also, according to the aspect of the invention, high-brightness, high-contrast display is accomplished in both the reflective display and the transmissive display without adopting a well-known multi-gap structure.

In accordance with an embodiment of the invention, the reflective polarization layer is partially formed in each sub-pixel region of the liquid crystal device. In this case, a portion of each sub-pixel region, at which the reflective polarization layer is partially formed, is a reflective display region, and the remainder of each sub-pixel region, at which the reflective polarization layer is not formed, is a transmissive display region. As a result, the transmissive display region and the reflective display region are clearly separated from each other. Consequently, the optical design is optimized for both the reflective display and the transmissive display, and therefore, picture quality of the liquid crystal device is further improved.

In accordance with an embodiment of the invention, the reflective polarization layer is almost wholly formed in each sub-pixel region. In this case, the reflective polarization layer partially transmits the polarized light component incident on the reflective polarization layer, and reflects a portion of the polarized light component. The reflective polarization layer may be formed in the shape of a plane in each sub-pixel region, and therefore, the manufacturing process is easily performed, and yield rate is increased. Also, the region can be widely used, and the optical design of the pixel is easy as compared to the case that each sub-pixel region is divided into the reflective display region and the transmissive display region.

In accordance with an embodiment of the invention, the reflective polarization layer includes a prism array, which is formed by arranging a plurality of prisms, and a dielectric interference film, which is formed on the prism array. In this case, the reflection rate and the transmission rate can be easily adjusted by the stacked structure of the dielectric interference film, and, especially, the reflective polarization layer is appropriately used in the structure in which the reflective polarization layer is wholly disposed in each sub-pixel region.

In accordance with an embodiment of the invention, the reflective polarization layer includes a metal reflective film having a plurality of openings, which are formed in the shape of a minute slit. In this case, the degree of polarization is high, and a patterning process is easily performed as compared to the structure in which the dielectric interference film is formed on the prism array. Consequently, the reflective polarization layer is appropriately used in the structure in which the reflective polarization layer is partially disposed in each sub-pixel region.

In accordance with an embodiment of the invention, the reflective polarization layer is electrically connected to the first electrode. In this case, the reflective polarization layer can be used as a portion of the electrode that applies voltage to the liquid crystal.

In accordance with an embodiment of the invention, the liquid crystal layer has a thickness approximately uniform in each sub-pixel region. In accordance with an embodiment of the invention, the liquid crystal device does not adopt the multi-gap structure, and therefore, the thickness of the liquid crystal layer is uniform in each sub-pixel region. Consequently, nonuniformity of the drive voltage in each sub-pixel region is prevented in the horizontal electric field mode liquid crystal device, in which the drive voltage is greatly changed depending upon the thickness of the liquid crystal layer, and therefore, high-quality transmissive display and reflective display are accomplished.

In accordance with an embodiment of the invention, the liquid crystal device further includes a light unit disposed at the outer surface side of the first substrate. In accordance with an embodiment of the invention, the reflective polarization layer that performs the reflective display and the first and second electrodes that drive the liquid crystal are disposed on the first substrate, and therefore, it is possible to construct the liquid crystal device such that the first substrate is not disposed at the display surface side. When the first substrate is not disposed at the display surface side, external light is diffusely reflected by metal wires formed on the first substrate for supplying a drive signal to the first electrode and the second electrode, and therefore, the visibility of the liquid crystal device is decreased. According to the aspect of the invention, however, such diffused reflection of the external light is prevented, and therefore, the visibility of the liquid crystal device is increased.

In accordance with an embodiment of the invention, the liquid crystal device further includes a polarization panel disposed between the first substrate and the lighting unit. The polarization panel has a transmission axis, and the reflective polarization layer has a transmission axis. The transmission axis of the polarization panel is approximately perpendicular to the transmission axis of the reflective polarization layer. Consequently, use efficiency of an illumination light incident on the lighting unit is maximized, and therefore, it is possible to accomplish bright transmissive display.

In accordance with an embodiment of the invention, the liquid crystal device further includes a color filter disposed at the first substrate or the second substrate, the color filter being divided into a plurality of plane regions having different chromaticity in each sub-pixel region. In this case, color display having appropriate chromaticity is possible at both the reflective display region and the transmissive display region. Consequently, the vividness of the liquid crystal device is increased, and the picture quality of the liquid crystal device is improved.

According to still another aspect of the invention, electronic equipment includes the liquid crystal device according to any aspects of the invention which was described above. In this case, the electronic equipment has a display part, in which the liquid crystal device is mounted. Consequently, high-brightness, high-contrast, wide view angle transmissive display and reflective display are accomplished.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A liquid crystal device according to a first embodiment of the invention will be described hereinafter with reference to the accompanying drawings. The liquid crystal device according to the first embodiment of the invention is a liquid crystal device adopting an in-plane switching (IPS) mode, which is a kind of horizontal electric field mode in which an electric field is applied to a liquid crystal in the substrate surface direction, i.e., a horizontal electric field is applied to the liquid crystal, to control the orientation of the liquid crystal, whereby picture display is performed.

Also, the liquid crystal device according to the first embodiment of the invention is a color liquid crystal device having a color filter on a substrate wherein three dots that output three colored lights, such as red, green, and blue, respectively, constitute a pixel. Consequently, a display region having the smallest display unit is referred to as "a sub-pixel region," and a display region including a set of dots (R, G, and B) is referred to as "a pixel region."

Figure 1:
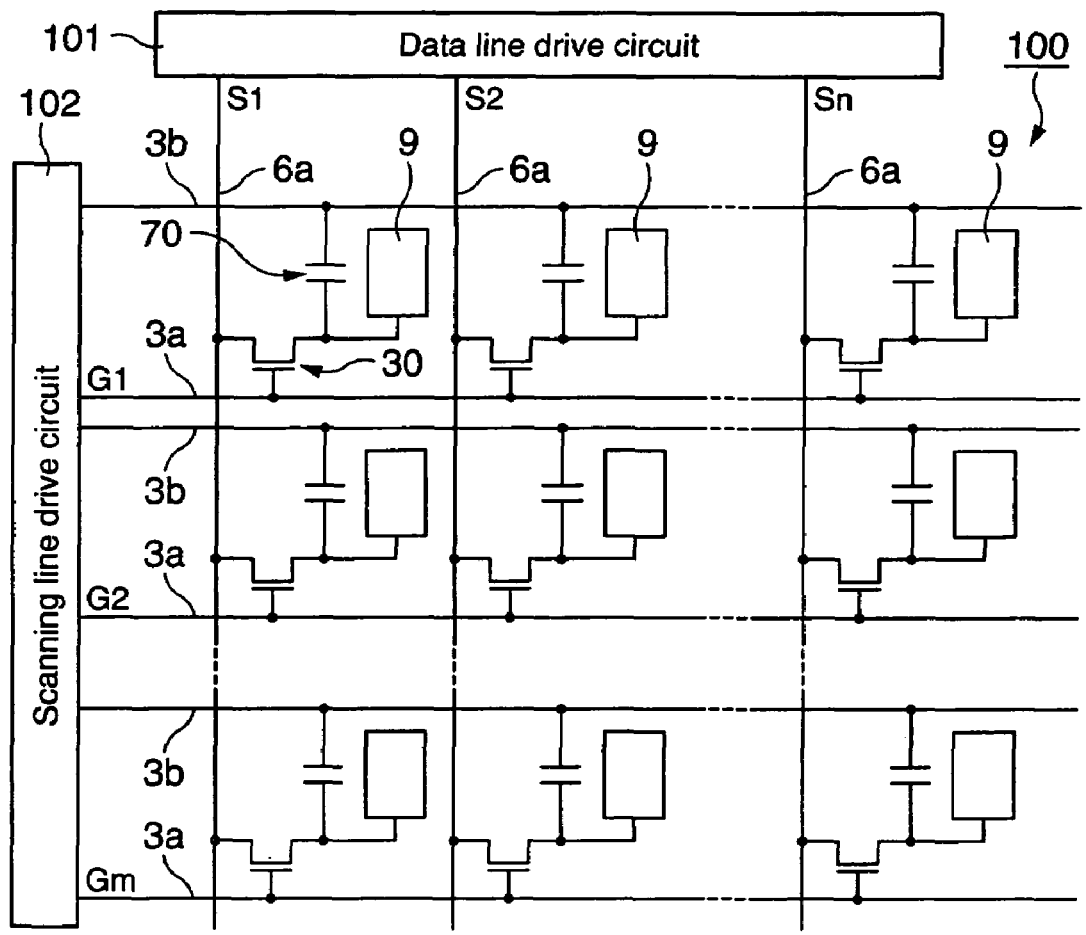
FIG. 1 is a circuit diagram of a liquid crystal device according to a first embodiment of the invention.
Figure 2A:
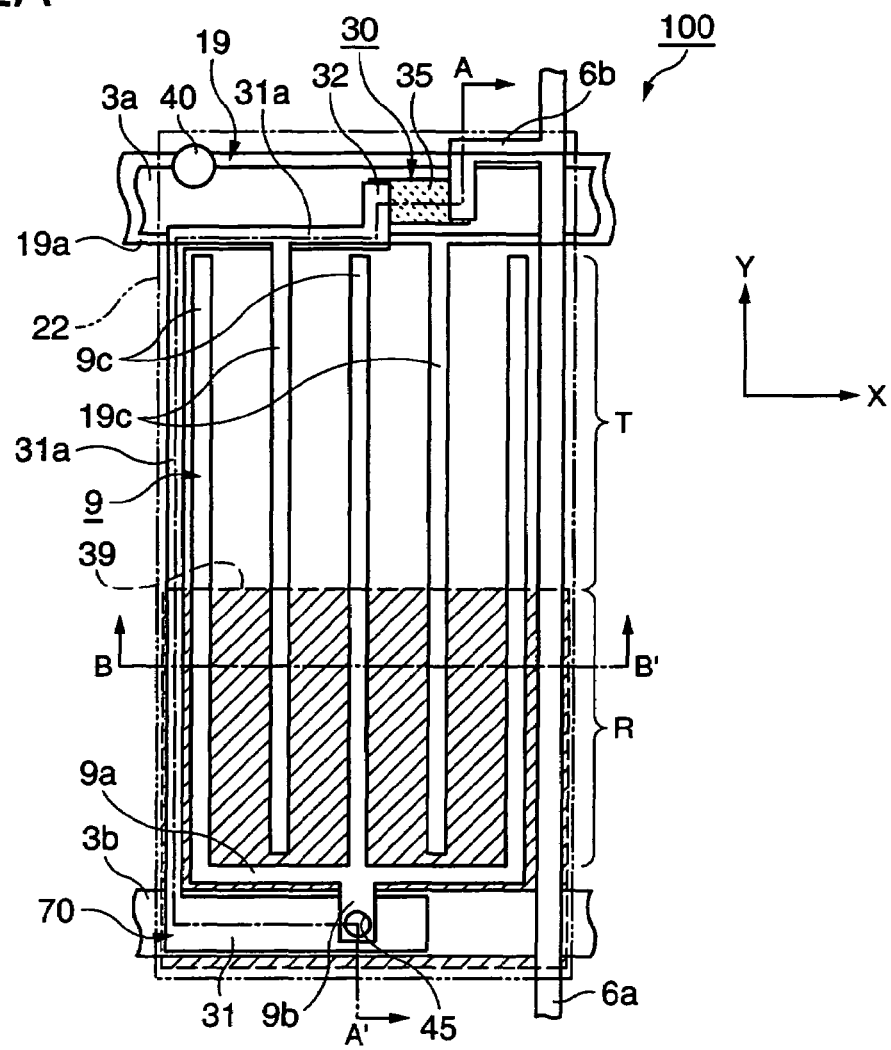
FIG. 2A is a plan view showing an arbitrary sub-pixel region of the liquid crystal device according to the first embodiment of the invention.
Figure 2B:
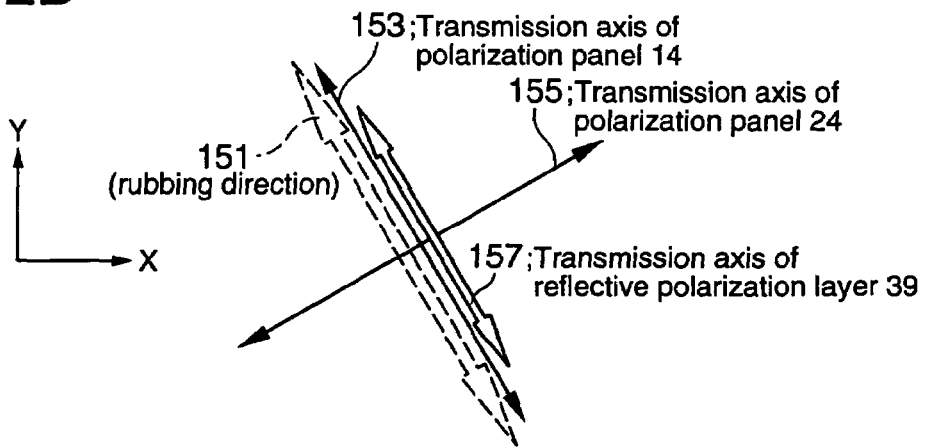
FIG. 2B is a view showing the arrangement of optical axes of the arbitrary sub-pixel region of the liquid crystal device according to the first embodiment of the invention.
Figure 3:
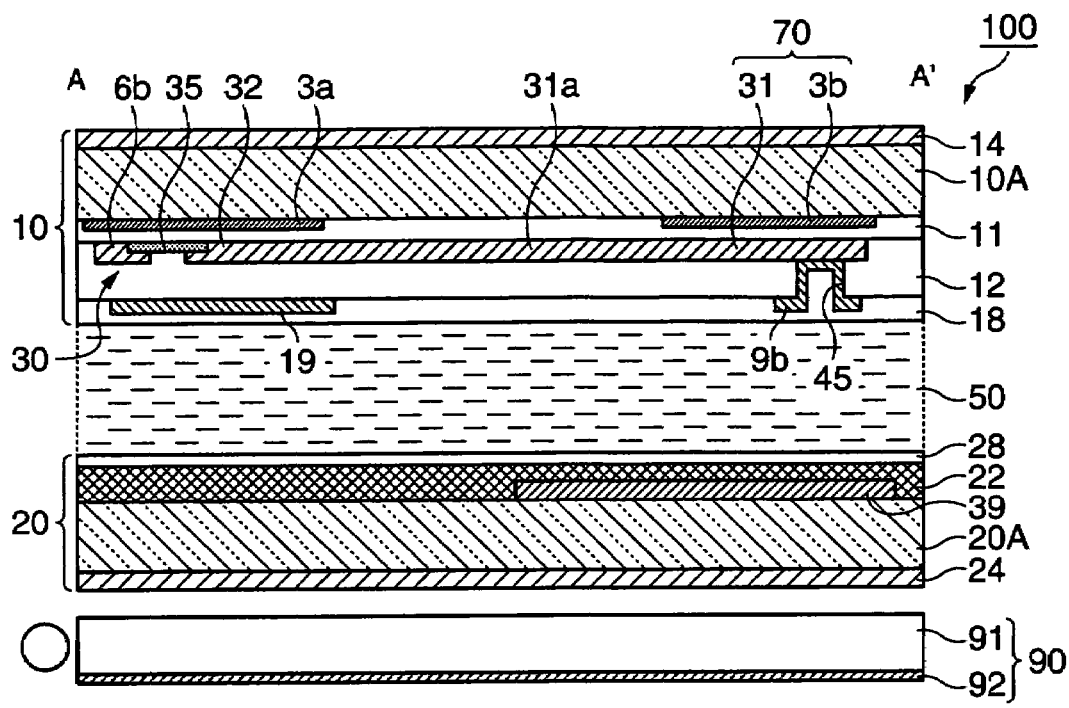
FIG. 3 is a sectional view taken along line A-A' of FIG. 2A.
Figure 4:
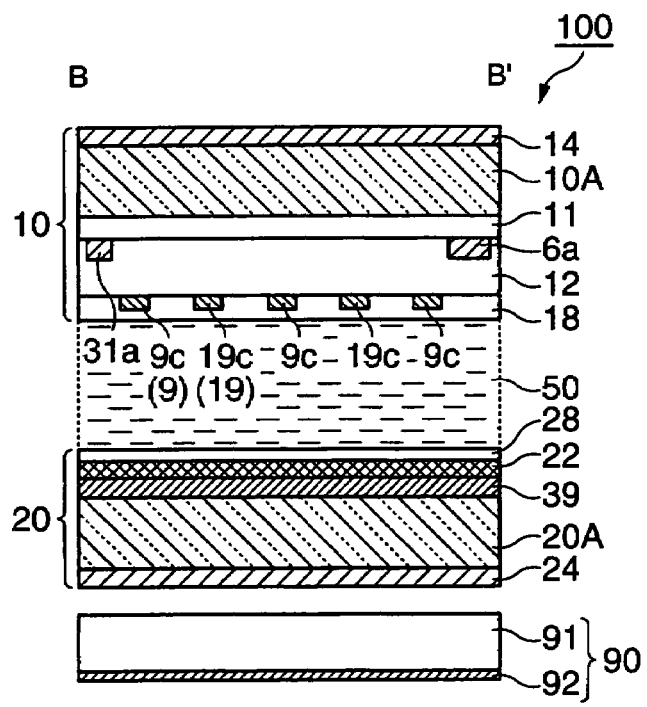
FIG. 4 is a sectional view taken along line B-B' of FIG. 2A.

FIG. 1 is a circuit diagram of a liquid crystal device 100 according to a first embodiment of the invention. FIG. 2A is a plan view showing an arbitrary sub-pixel region of the liquid crystal device 100, and FIG. 2B is a view showing the arrangement of optical axes of optical elements constituting the liquid crystal device 100. FIG. 3 is a partially sectional view taken along line A-A' of FIG. 2A, and FIG. 4 is a partially sectional view taken along line B-B' of FIG. 2A.

In the respective drawings, layers and members are shown in different scales to enlarge the layers and the members on the respective drawings such that the layers and the members can be recognized.

As shown in FIG. 1, thin film transistors 30 (hereinafter, referred to as "TFTs") for performing switching control between pixel electrodes 9 are formed at a plurality of sub-pixel regions, which are formed in the shape of a matrix to constitute the picture display region of the liquid crystal device 100, respectively. Data lines 6a extending from a data line drive circuit 101 are electrically connected to sources of the TFTs 30. The data line drive circuit 101 supplies picture signals S1, S2, ..., and Sn to the respective pixels via the data lines 6a. The picture signals S1 to Sn may be sequentially supplied to the pixels in the order of the associated lines. Alternatively, the data lines 6a may be divided into groups such that the neighboring data lines 6a paired off into couples, and then the picture signals may be sequentially supplied to the pixels in groups.

Also, scanning lines 3a extending from a scanning line drive circuit 102 are electrically connected to gates of the TFTS 30. Scanning signals G1, G2, ..., and Gm, which are supplied in pulse to the scanning lines 3a from the scanning line drive circuit 102 in a predetermined timing, are sequentially applied to the gates of the TFTs 30 in the order of the associated lines. The pixel electrodes 9 are electrically connected to drains of the TFTs 30, respectively. The TFTs 30, which are switching elements, are turned on for a predetermined period of time, as the scanning signals G1, G2, ..., and Gm are input to the TFTs 30, and therefore, the picture signals S1, S2, ..., and Sn, which are supplied from the data lines 6a, are written into the pixel electrodes 9 in a predetermined timing.

The picture signals S1, S2, ..., and Sn with a predetermined level, which are written into the liquid crystal via the pixel electrodes 9, are maintained between the pixel electrodes 9 and a common electrode opposite to the pixel electrodes 9 via the liquid crystal for a predetermined period of time. Here, accumulation capacitors 70 are provided in parallel with liquid crystal capacitors, which are formed between the pixel electrodes 9 and the common electrode in order to prevent leakage of the maintained picture signals. The accumulation capacitors 70 are disposed between the drains of the TFTs 30 and capacitor lines 3b.

Next, the structure of the liquid crystal device 100 will be described in detail with reference to FIGS. 2A, 2B, and 3. As shown in FIG. 3, the liquid crystal device 100 includes a liquid crystal layer 50 disposed between a TFT array substrate (first substrate) 10 and an opposite substrate (second substrate) 20. The liquid crystal layer 50 is sealed between the substrates 10 and 20 by a sealing member (not shown), which is disposed along the outer edge of the region at which the substrates 10 and 20 are opposite to each other. At the rear surface of the opposite substrate 20 (the lower surface in the drawing) is disposed a back light (a lighting unit) 90 including a light guide panel 91 and a reflective panel 92.

As shown in FIG. 2A, a pixel electrode (second electrode) 9, which is approximately formed in the planar shape of a rake (in the planar shape of the teeth of a comb) and which is elongated in the Y-axis direction, and a common electrode (first electrode) 19, which is approximately formed in the planar shape of the teeth of a comb, are disposed at the sub-pixel region of the liquid crystal device 100. At the left-upper corner of the sub-pixel region is mounted a columnar spacer 40 for spacing the TFT array substrate 10 and the opposite substrate 20 a predetermined distance from each other.

The pixel electrode 9 includes a plurality (5 in the drawing) of band-shaped electrodes 9c, which extend in the Y-axis direction, a base end part 9a, which is connected to the respective ends of the band-shaped electrodes 9c at the lower side (−Y side) thereof and extends in the X-axis direction, and a contact part 9b extending from the X-axis directional center of the base end part 9a toward the −Y side.

The common electrode 19 includes a plurality of bar-shaped electrodes 19c, which are alternately arranged with the band electrodes 9c of the pixel electrode 9 and extend in parallel with the band-shaped electrodes 9c (in the Y-axis direction), and a main line part 19a, which is connected to the ends of the band-shaped electrodes 19c at the +Y side thereof and extends in the X-axis direction. The common electrode 19 is an electrode member approximately formed in the planar shape of the teeth of a comb, which extends over the plurality of sub-pixel regions arranged in the X-axis direction.

In the sub-pixel region shown in FIG. 2A, voltage is applied between the three band-shaped electrodes 9c extending in the Y-axis direction and the two band-shaped electrodes 19c disposed between the three band-shaped electrodes 9c, whereby an electric field is applied to the liquid crystal of the sub-pixel region in the XY plane direction (the substrate surface direction), i.e., a horizontal electric field is applied to the liquid crystal of the sub-pixel region.

The data line 6a, which extends in the X-axis direction, the scanning line 3a, which extends in the Y-axis direction, and the capacitor line 3b, which is disposed at the edge of the sub-pixel region at the side opposite to the scanning line 3a while extending in parallel with the scanning line 3a, are formed at the TFT 30. The TFT 30 is disposed in the vicinity of the intersection between the data line 6a and the scanning line 3a. The TFT 30 includes a semiconductor layer 35 made of amorphous silicon, which is partially formed in the plane region of the scanning line 3a, a source electrode 6b formed such that the source electrode 6b partially overlaps with the semiconductor layer 35 on the plane, and a drain electrode 32. The scanning line 3a serves as a gate electrode of the TFT 30 at the position at which the scanning line 3a partially overlaps with the semiconductor layer 35 on the plane.

The source electrode 6b of the TFT 30 diverges from the data line 6a and extends to the semiconductor layer 35 such that the source electrode 6b is approximately formed in the planar shape of a reverse L. The drain electrode 32 of the TFT 30 is electrically connected to a connection wire 31a at the −Y side end thereof, and is electrically connected to a capacitor electrode 31 via the connection wire 31a. The capacitor electrode 31 is a conductive member, which is approximately formed in the planar shape of a rectangle and overlaps with the capacitor line 3b on the plane. The contact part 9b of the pixel electrode 9 is disposed on the capacitor electrode 31 such that the contact part 9b overlaps with the capacitor electrode 31 on the plane, and a pixel contact hole 45 is formed at the position at which the contact part 9b overlaps with the capacitor electrode 31. The capacitor electrode 31 and the pixel electrode 9 are electrically connected to each other via the pixel contact hole 45. Also, the accumulation capacitor 70, which uses the capacitor electrode 31 and the capacitor line 3b opposite to each other in the thickness direction as electrodes, are formed at the region at which the capacitor electrode 31 overlaps with the capacitor line 3b on the plane.

Also, a color filter 22, which is formed in approximately the same planar shape as the sub-pixel region, and a reflective polarization layer 39 occupying the planar region of approximately the lower half of the sub-pixel region (the −Y side regions of two regions divided in the Y-axis direction) are disposed at the sub-pixel region shown in FIG. 2A. The reflective polarization layer 39 is a reflective polarization layer made of a light-reflective metal film (a metal reflective film) having a minute slit structure, which will be described below in detail. The reflective polarization layer 39 and the color filter 22 are formed on the opposite substrate 20. And the region at which the reflective polarization layer 39, which is a portion of the region at which the band-shaped electrodes 9c and 19c are alternately arranged, is formed is a reflective display region R of the sub-pixel region, and the remaining region is a transmissive display region T, as shown in FIG. 2A.

Referring to FIG. 3, the liquid crystal layer 50 is disposed between the TFT array substrate 10 and the opposite substrate 20, which are arranged opposite to each other. At the outer surfaces of the TFT array substrate 10 and the opposite substrate 20 (the sides opposite to the liquid crystal layer 50) are disposed polarization panels 14 and 24, respectively.

The TFT array substrate 10 includes a light-transmissive substrate body 10A, which is made of glass, quartz, or plastic. The scanning line 3a and the capacitor line 3b are formed at the inner surface of the substrate body 10A (the liquid crystal layer 50 side). The scanning line 3a and the capacitor line 3b are covered. In the inner surface of the substrate body 10A is also formed a gate insulation film 11, which is made of a transparent insulation film, such as silicon oxide.

The semiconductor layer 35, which is made of amorphous silicon, is formed on the gate insulation film 11. The source electrode 6b and the drain electrode 32 are disposed at the semiconductor layer 35 such that the source electrode 6b and the drain electrode 32 partially run on the semiconductor layer 35. The drain electrode 32 is integrally formed with the connection wire 31a and the capacitor electrode 31. The semiconductor layer 35 is opposite to the scanning line 3a via the gate insulation film 11. The scanning line 3a constitutes the gate electrode of the TFT 30 at the opposite region.

The capacitor electrode 31 is opposite to the capacitor line 3b via the gate insulation film 11. The accumulation capacitor 70 using the gate insulation film 11 as the dielectric film thereof is formed at the region at which the capacitor electrode 31 and the capacitor line 3b are opposite to each other.

The semiconductor layer 35, the source electrode 6b, the drain electrode 32, and the capacitor electrode 31 are covered to form an interlayer insulation film 12, which is made of silicon oxide. The pixel electrode 9, which is made of a transparent conductive material, such as indium tin oxide (ITO), and the common electrode 19, are formed on the interlayer insulation film 12. The pixel electrode 9, which is made of a transparent conductive material, such as indium tin oxide (ITO), is formed on the interlayer insulation film 12. Through the first interlayer insulation film 12 and a second interlayer insulation film 13 is formed a pixel contact hole 45, which extends to the capacitor electrode 31. The contact part 9b of the pixel electrode 9 is partially located in the pixel contact hole 45. Consequently, the pixel electrode 9 and the capacitor electrode 31 are electrically connected to each other. The pixel electrode 9 and the common electrode 19 are covered to form an orientation film 18, which is made of polyimide.

Referring now to FIG. 4, which is a sectional view taken along line B-B' of FIG. 2A, the band-shaped electrodes 9c of the pixel electrode 9 and the band-shaped electrodes 19c of the common electrode 19 are alternately arranged at the same level on the interlayer insulation film 12. A horizontal electric field is generated between the band-shaped electrodes 9c and the band-shaped electrodes 19c in the X-axis direction shown in FIG. 2A by voltage written into the pixel electrode 9 via the TFT 30, and the orientation state of the liquid crystal molecules of the liquid crystal layer 50 is controlled by this horizontal electric field.

On the other hand, the reflective polarization layer 39 is partially disposed at the inner surface of the opposite substrate 20 (the liquid crystal layer 50 side), and the color filter 22 is also disposed at the inner surface of the opposite substrate 20 to cover the reflective polarization layer 39. On the color filter 22 is stacked an orientation film 28. The polarization panel 24 is disposed at the outer surface of the opposite substrate 20. As described above, the region at which the reflective polarization layer 39 is formed is the reflective display region R, and the region at which the reflective polarization layer 39 is not formed is the transmissive display region T.

It is preferable that the color filter 22 be divided into two kinds of regions having different chromaticity in the pixel region. Specifically, a first color material region is disposed in correspondence to the plane region of the transmissive display region T, and a second color material region is disposed in correspondence to the plane region of the reflective display region T. The chromaticity of the first color material region may be higher than that of the second color material region. In this case, the chromaticity of a display light is prevented from being changed between the transmissive display region T, at which the display light is transmitted through the color filter 22 only once, and the reflective display region R, at which the display light is transmitted through the color filter 22 twice. Consequently, the recognition of the reflective display and the transmissive display is uniform, and therefore, display quality is improved.

It is also preferable that an insulation film, which is made of a transparent resin material, be stacked on the color filter 22. Since the reflective polarization layer 39 is covered to form the color filter 22, distortion of the electric field due to the reflective polarization layer 39, which is made of a metal film, such as aluminum, is prevented by the color filter 22. Furthermore, when several insulation films are stacked, the effect can be further increased. Also, the surface of the opposite substrate 20 is even by the insulation film, and therefore, the thickness of the liquid crystal layer 50 is uniform. Consequently, the decrease of contrast due to nonuniformity of the drive voltage in the sub-pixel region can be prevented.

Figure 5A:
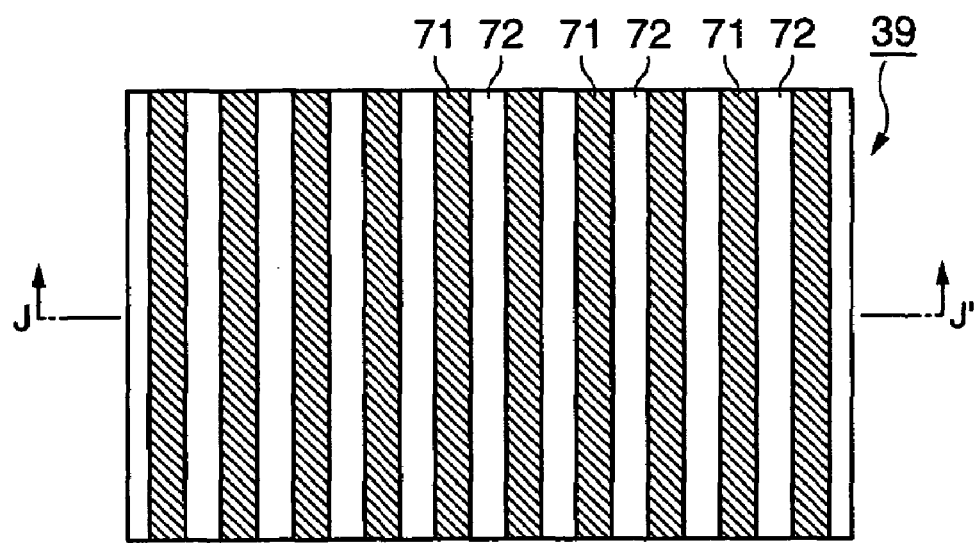
FIG. 5A is a plan view showing a reflective polarization layer.

Now, the structure and operation of the reflective polarization layer 39 will be described with reference to FIGS. 5A and 5B. FIG. 5A is a plan view showing the reflective polarization layer 39, and FIG. 5B is a sectional view taken along line J-J' of FIG. 5A.

Figure 5B:
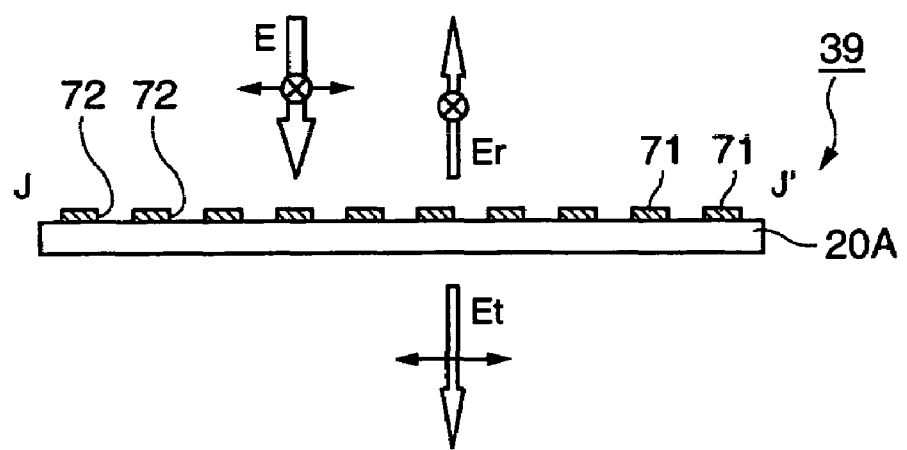
FIG. 5B is a side view showing the reflective polarization layer.

As shown in FIGS. 5A and 5B, the reflective polarization layer 39 includes a metal reflective film 71, which is made of light-reflective metal, such as aluminum. At the metal reflective film 71 are formed a plurality of minute slits (openings) 72, which are formed in the planar shape of a stripe, at a predetermined pitch. The plurality of slits 72 are arranged in parallel with each other, and have the same width. The width of the slits 72 is approximately 30 nm to 300 nm, and the line width of the metal film 71, which is formed in the shape of a line as a result of forming the plurality of slits 72 at the predetermined pitch, is approximately 30 nm to 300 nm.

When light E is incident on the reflective polarization layer 39 with the above-stated construction from the upper surface side, as shown in FIG. 5B, the polarized light component which is parallel with the longitudinal direction of the slits 72, is reflected as a reflected light Er, and the polarized light component which is parallel with the lateral direction of the slits 72, is transmitted as a transmitted light Et. In other words, the reflective polarization layer 39 has a reflection axis, which is parallel with the extension direction of the slits 72, and a transmission axis, which is perpendicular to the reflection axis.

As shown in FIG. 2B, which is a view showing the arrangement of optical axes, a transmission axis 157 of the reflective polarization layer 39 (the direction perpendicular to the extension direction of the slits 72) is located, such that the transmission axis 157 is parallel with a transmission axis 153 of the polarization panel 14 at the TFT array substrate 10 side and is perpendicular to a transmission axis 155 of the polarization panel 24 at the opposite substrate 20 side, in the liquid crystal device 100. Also, in the liquid crystal device 100 according to the first embodiment of the invention, the orientation films 18 and 28 are rubbed in the same direction on the plane. The direction of the orientation films 18 and 28 is a rubbing direction 151 as shown in FIG. 2B. Consequently, the transmission axis 157 of the reflective polarization layer 39 is located in parallel with the rubbing direction 151 of the orientation films 18 and 28.

Furthermore, the rubbing direction 151 is located at an angle of approximately 30 degrees to the extension direction of the band-shaped electrodes 9c and 19c, in which the band-shaped electrodes 9c and 19c extend in parallel with the pixel arrangement direction (the Y-axis direction) of the liquid crystal device 100.

The liquid crystal device 100 with the above-stated construction is an IPS mode liquid crystal device. When the picture signal (voltage) is applied to the pixel electrode 9 via the TFT 30, an electric field is generated between the pixel electrode 9 and the common electrode 19 in the substrate surface direction (in the X-axis direction of FIG. 2), and the liquid crystal is driven by the generated electric field. The transmission rate/the reflection rate of each dot is changed to perform the picture display. As shown in FIG. 2B, the orientation film 18 and 28, which are opposite to each other while the liquid crystal layer 50 is disposed between the orientation film 18 and 28, are rubbed in the same direction on the plane. In the state that the voltage is not applied to the pixel electrode 9, the liquid crystal molecules constituting the liquid crystal layer 50 are oriented horizontally between the substrates 10 and 20 along the rubbing direction 151. Consequently, when the electric field generated between the pixel electrode 9 and the common electrode 19 is applied to the liquid crystal layer 50, the liquid crystal molecules are oriented along the lateral direction (the X-axis direction) of the band-shaped electrodes 9c and 19c shown in FIG. 2A. The liquid crystal device 100 performs bright and dark display using double refraction based on the difference in the oriented state of the liquid crystal molecules.

Figure 6:
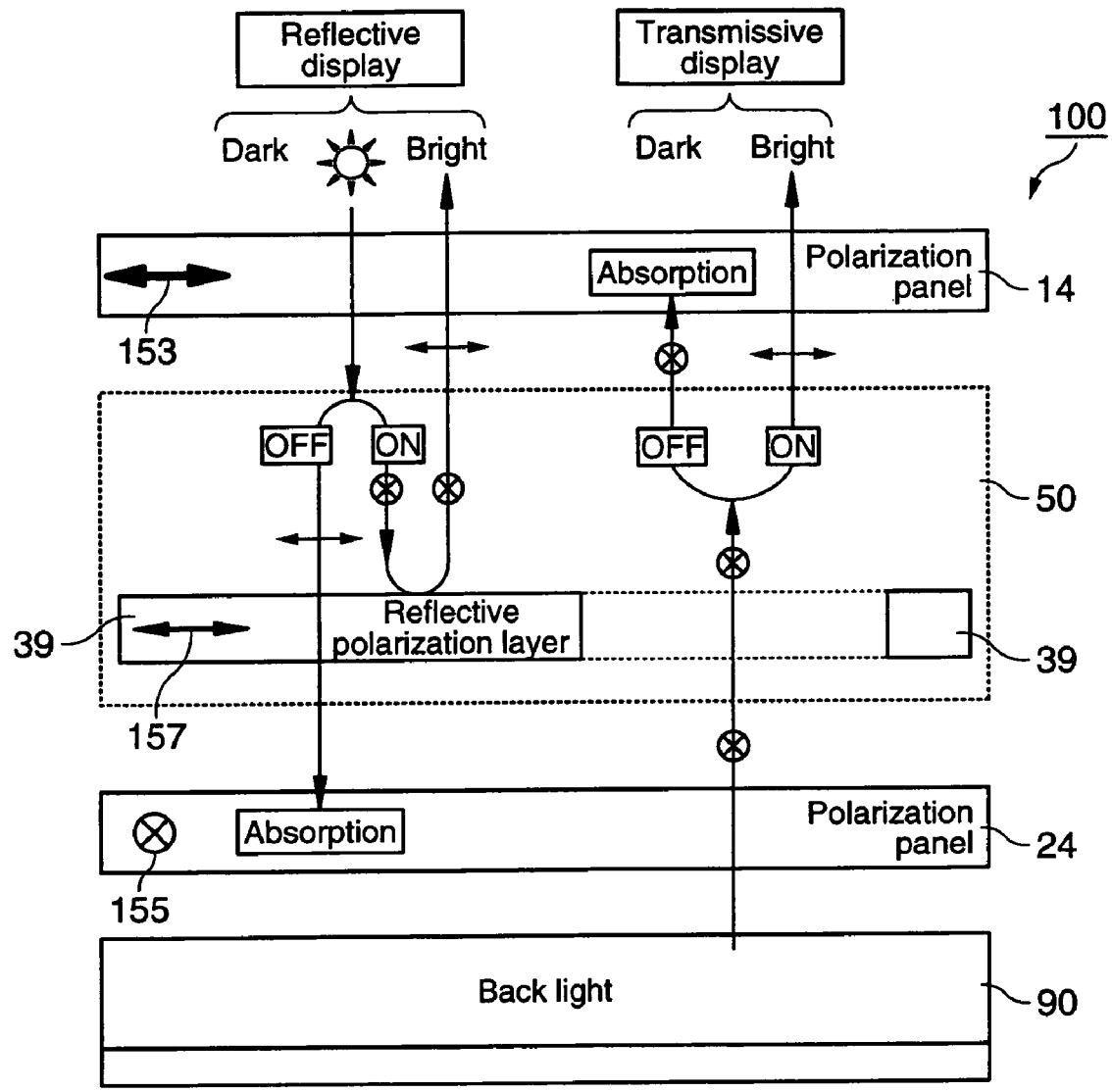
FIG. 6 is a view illustrating the operation of the liquid crystal device according to the first embodiment of the invention.

Next, the operation of the liquid crystal device 100 with the above-stated construction will be described with reference to FIG. 6. FIG. 6 is a view illustrating the operation of the liquid crystal device 100. The components of FIG. 6 are components extracted from those of FIG. 3, which are necessary for the following description. The polarization panel 14, the liquid crystal layer 50, the reflective polarization layer 39, the polarization panel 24, and the back light 90 are shown in FIG. 6 in order from the above.

First, the transmissive display (the transmission mode) shown in the right side of the FIG. 6 will be described.

In the liquid crystal device 100, the light emitted from the back light 90 is transmitted through the polarization panel 24, and is converted into a linear polarized light, which is parallel with the transmission axis 155 of the polarization panel 24. Subsequently, the linear polarized light is incident on the liquid crystal layer 50 via the non-formation region of the reflective polarization layer 39. When the liquid crystal layer 50 is on (the selected voltage is applied between the pixel electrode 9 and the common electrode 19), the incident light is given a predetermined phase difference ($\lambda/2$) by the liquid crystal layer 50, and is converted into a linear polarized light, which is parallel with the transmission axis 153 of the polarization panel 14, whereby the light transmitted through the polarization panel 14 is recognized as a display light, and therefore, the corresponding dot is brightly displayed.

When the liquid crystal layer 50 is off (the selected voltage is not applied between the pixel electrode 9 and the common electrode 19), on the other hand, the incident light reaches the polarization panel 14 while the polarized state of the incident light is maintained, and is absorbed into the polarization panel 14, which has an absorption axis (an optical axis perpendicular to the transmission axis 153) parallel with the incident light, whereby the corresponding dot is darkly displayed.

Furthermore, the light incident on the reflective polarization layer 39, which is a portion of the light transmitted through the polarization panel 24, is reflected by the reflective polarization layer 39, which has the reflection axis parallel with the linear polarized light, and therefore, the light is not incident on the liquid crystal layer 50, but is returned to the back light 90 side.

Next, the reflective display shown in the left side of the FIG. 6 will be described.

The light incident on the polarization panel 14 from the above (from the outside) is transmitted through the polarization panel 14, and is converted into a linear polarized light, which is parallel with the transmission axis 153 of the polarization panel 14. Subsequently, the linear polarized light is incident on the liquid crystal layer 50. At this time, when the liquid crystal layer 50 is on, the incident light is given a predetermined phase difference ($\lambda/2$) by the liquid crystal layer 50, and is incident on the reflective polarization layer 39. As shown in FIG. 2B, the reflective polarization layer 39 has the transmission axis 157, which is parallel with the transmission axis 153 of the polarization panel 24, and the reflection axis, which is perpendicular to the transmission axis 153 of the polarization panel 24. Consequently, the light, which is transmitted through the liquid crystal layer 50, which is on, and is incident on the reflective polarization layer 39, is reflected while the polarized state of the light is maintained. The reflected light, which is incident on the liquid crystal layer 50 again, is returned to its polarized state at the time of incidence (the linear polarized light parallel with the transmission axis of the polarization panel 14) by the operation of the liquid crystal layer 50, and is incident on the polarization panel 14. As a result, the reflected light, which is transmitted through the polarization panel 14, is recognized as a display light, and therefore, the corresponding dot is brightly displayed.

When the liquid crystal layer 50 is off, on the other hand, the light incident on the liquid crystal layer 50 from the polarization panel 14 is incident on the reflective polarization layer 39 while the polarized state of the light is maintained, and is transmitted through the reflective polarization layer 39, which has the transmission axis 157 parallel with the light. Subsequently, the light is absorbed by the polarization panel 24, which has the absorption axis parallel with the light, whereby the corresponding dot is darkly displayed.

Figure 7:
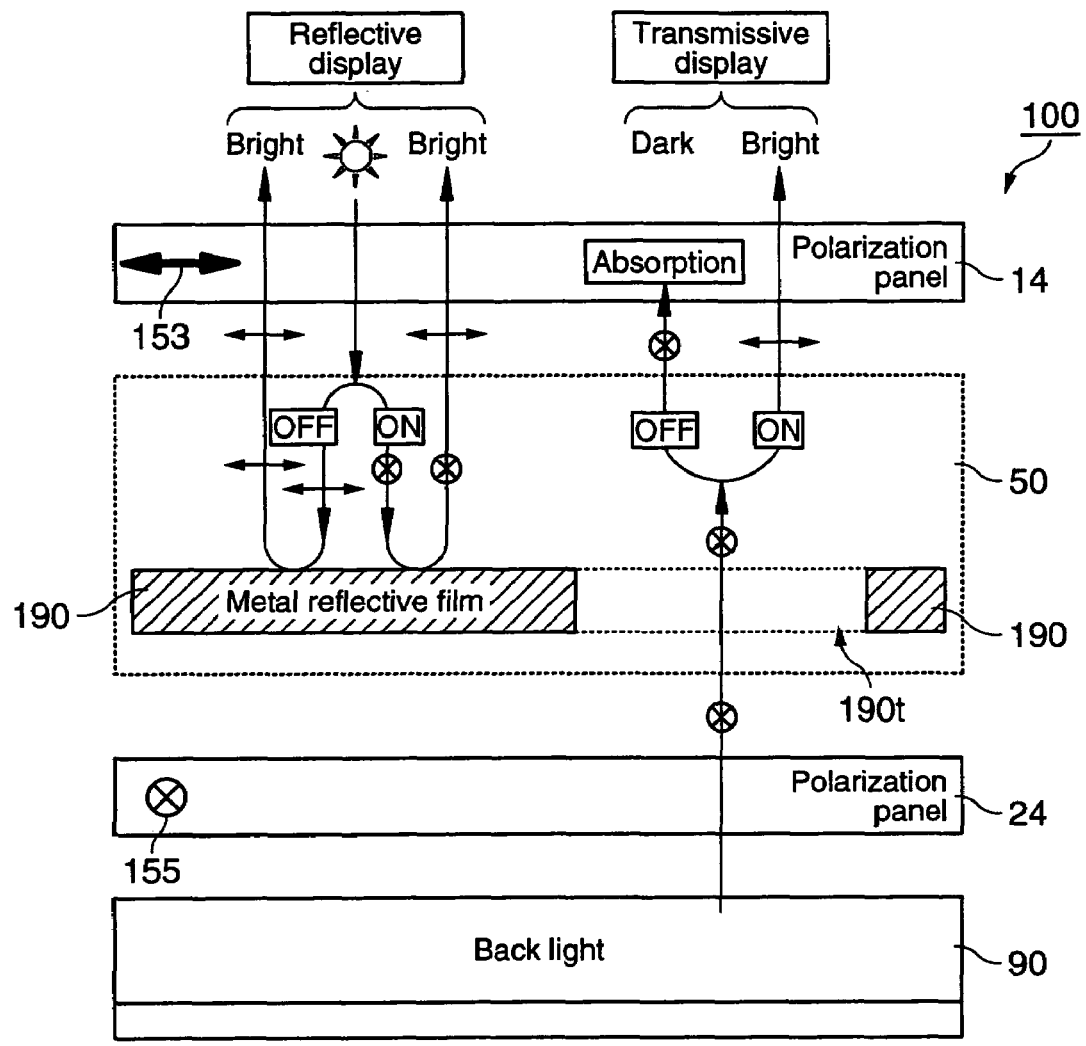
FIG. 7 is a view illustrating the operation of a liquid crystal device shown as a comparative example.

FIG. 7 is a view illustrating the operation of a liquid crystal device 100, which is a kind of IPS mode liquid crystal device, including a metal reflective film 190, which is made of aluminum, partially disposed in the sub-pixel region. That is to say, the liquid crystal device 100 is a combination of the IPS mode liquid crystal device and a related semi-transmissive reflective liquid crystal device. In the liquid crystal device 100, the region at which the metal reflective film 190 is formed in the sub-pixel region is a reflective display region, and the region at which an opening 190t formed at the metal reflective film 190 is formed is a transmissive display region.

The structure of the liquid crystal device 100 excluding the metal reflective film 190 is identical to that of the liquid crystal device according to the first embodiment of the invention.

As shown in FIG. 7, the liquid crystal device 100 is capable of performing the same bright and dark display as the liquid crystal device according to the invention in connection with the transmissive display. In connection with the reflective display, however, the liquid crystal device 100 performs only the bright display irrespective of the on/off state of the liquid crystal layer 50, and therefore, normal display is not possible. Also, it is possible to dispose a phase difference panel ($\lambda/4$ panel) between the polarization panel 14 and the liquid crystal layer 50 in the liquid crystal device 100 such that a circular polarized light can be incident on the liquid crystal layer 50 at the time of the reflective display. In the horizontal electric field mode liquid crystal device which is oriented in parallel in the substrate surface, however, the phase difference of the liquid crystal layer 50 is not changed by the electric field response as in the related vertical electric field mode liquid crystal device, but the direction of the optical axis of the liquid crystal layer 50 in the surface thereof is changed. Consequently, it is difficult to accomplish high display quality when the circular polarization mode is applied. In the circular polarization, when the phase difference given by the liquid crystal layer 50 is approximately $\lambda/2$, the light is emitted from the liquid crystal layer 50 in the same polarized state without dependence in the direction of the optical axis of the liquid crystal layer 50. Also, when the phase difference given by the liquid crystal layer 50 is not $\lambda/2$, it is difficult to accomplish high display quality in the reflective display and the transmissive display.

Also, a semi-transmissive reflective liquid crystal device wherein the thickness of the liquid crystal layer of the reflective display region is half that of the transmissive display region, a so-called multi-gap type semi-transmissive reflective liquid crystal device is known as the semi-transmissive reflective liquid crystal device. However, the drive voltage is greatly changed depending upon the thickness of the liquid crystal layer in the horizontal electric field mode liquid crystal device. For this reason, the reduction of the display quality due to the drive voltage difference between the reflective display region and the transmissive display region is hardly avoided, although the above-mentioned multi-gap structure is applied to the horizontal electric field mode liquid crystal device, and therefore, it is difficult to accomplish high-quality semi-transmissive reflective display.

On the contrary, the liquid crystal device 100 according to the first embodiment of the invention has the structure in which the reflective polarization layer 39 is partially disposed in the sub-pixel region. Consequently, high-contrast reflective display and transmissive display are accomplished without using the circular polarization mode or the multi-gap structure, and the semi-transmissive reflective liquid crystal device according to the first embodiment of the invention has high picture quality although the structure of the semi-transmissive reflective liquid crystal device is simplified. Also, the thickness of the liquid crystal layer in the sub-pixel region is uniform, and therefore, the drive voltage difference is not made between the transmissive display region T and the reflective display region R. Consequently, the display state is not changed in the reflective display and the transmissive display. Furthermore, in the case that the multi-gap structure is formed in the sub-pixel region, the region at which the thickness of the liquid crystal is successively changed is formed at the boundary of the regions at which the thicknesses of the liquid crystal are different. As a result, the orientation of the liquid crystal molecules is in disorder at the boundary region, and therefore, leakage of the light occurs. However, the above-mentioned problem is not caused in the liquid crystal device 100 according to the first embodiment of the invention, and high-contrast display is accomplished.

Also, the reflective polarization layer 39 used in the liquid crystal device according to the first embodiment of the invention is accurately formed on the substrate body 20A, for example, by forming an aluminum film and patterning the aluminum film using a photolithography technology. Consequently, the reflective polarization layer 39 can be appropriately used in a high-definition liquid crystal device having narrow sub-pixel regions.

Second Embodiment

Now, a liquid crystal device according to a second embodiment of the invention will be described with reference to FIGS. 8 to 12.

Figure 8:
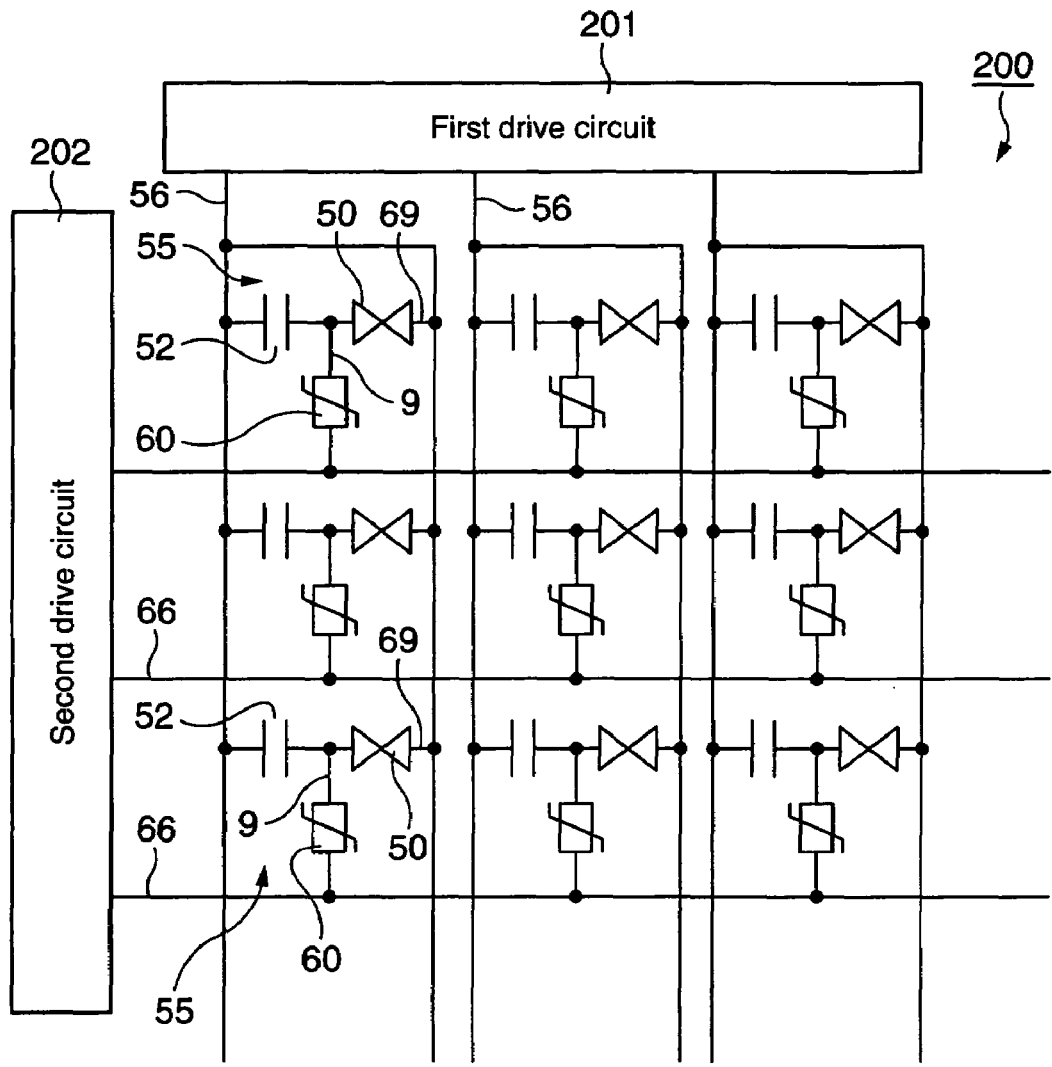
FIG. 8 is a circuit diagram of a liquid crystal device according to a second embodiment of the invention.
Figure 9A:
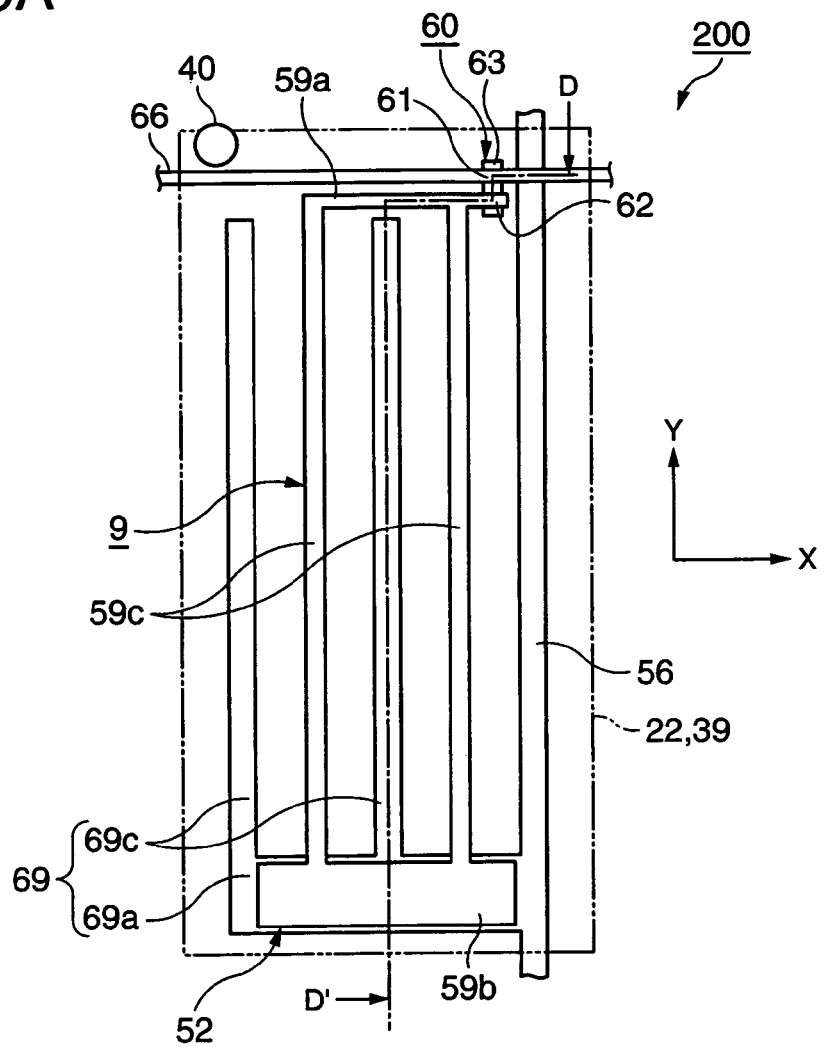
FIG. 9A is a plan view showing an arbitrary sub-pixel region of the liquid crystal device according to the second embodiment of the invention.
Figure 9B:
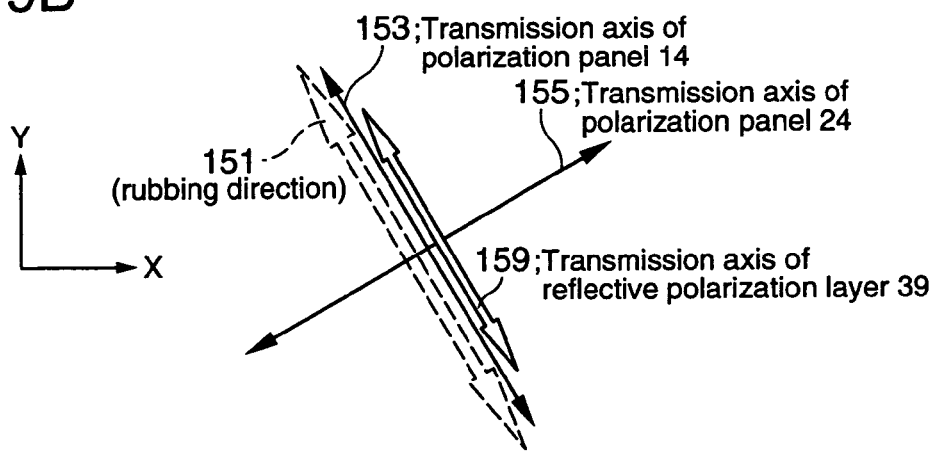
FIG. 9B is a view showing the arrangement of optical axes of the arbitrary sub-pixel region of the liquid crystal device according to the second embodiment of the invention.
Figure 10:
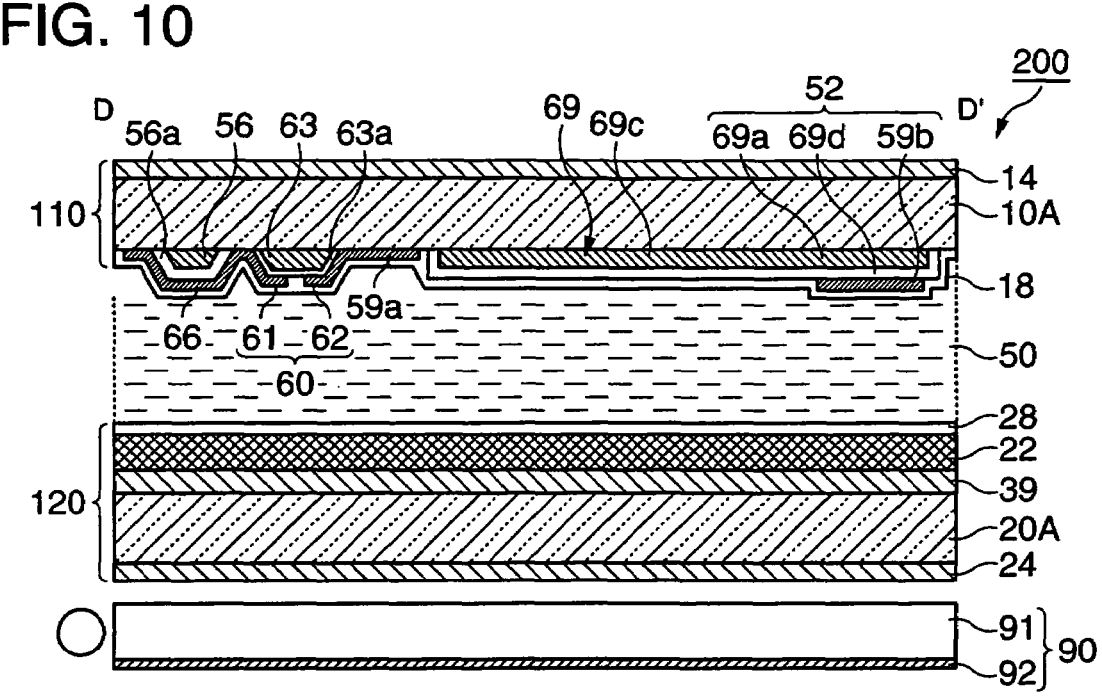
FIG. 10 is a sectional view taken along line D-D' of FIG. 9A.

FIG. 8 is a circuit diagram of the liquid crystal device 200 according to the second embodiment of the invention including a plurality of sub-pixel regions arranged in the shape of a matrix. FIG. 9A is a plan view showing an arbitrary sub-pixel region of the liquid crystal device 200 according to the second embodiment of the invention, and FIG. 9B is a view showing the arrangement of optical axes of the arbitrary sub-pixel region of the liquid crystal device 200 according to the second embodiment of the invention. FIG. 10 is a sectional view taken along line D-D' of FIG. 9A.

The liquid crystal device 200 according to the second embodiment of the invention is an active matrix type liquid crystal device using thin film diode (TFD) elements as the pixel switching elements. Also, the liquid crystal device 200 according to the second embodiment of the invention has an IPS mode electrode structure as in the liquid crystal device according to the first embodiment of the invention. Furthermore, the components of the liquid crystal device 200 according to the second embodiment of the invention, which are identical to those of the liquid crystal device 100 according to the first embodiment of the invention, will not be described hereinafter. Also, in the accompanying drawings, with reference to which the invention will be described hereinafter, components of liquid crystal devices according to other embodiments of the invention, which are identical to those of the liquid crystal device 100 according to the first embodiment of the invention, are indicated by the same reference numerals as those of the liquid crystal device 100 according to the first embodiment of the invention.

As shown in FIG. 8, dots 55 are arranged in the planar shape of a matrix. Also, the liquid crystal device 200 includes a first drive circuit 201 and a second drive circuit 202. The liquid crystal device 200 further includes a plurality of first wires 56 and a plurality of second wires 66, which intersect the first wires 56. The first wires 56 supply a signal from the first drive circuit 201 to the respective dots 55, and the second wires 66 supply a signal from the second drive circuit 202 to the respective dots 55. At each of the dots 55, a TFD element 60 and a pixel electrode 9 are connected in series to the corresponding second wire 66, and a liquid crystal layer (liquid crystal capacitor) 50 is formed between a common electrode 69, which is electrically connected to the first wires 56, and the corresponding pixel electrode 9. Also, a maintenance capacitor 52 is disposed between the corresponding first wire 56 and the corresponding pixel electrode 9 in each of the dots 55.

According to the circuit constructed as described above, the driving of the liquid crystal is controlled based on the switching characteristics of the TFD elements 60, and bright and dark display is performed for each dot 55 based on the driving of the liquid crystal, and therefore, picture display is performed at the display region of the liquid crystal device 200.

Referring now to FIG. 9A, the pixel electrode (second electrode) 9, the common electrode (first electrode) 69, and the TFD element 60 are disposed at a sub-pixel region of the liquid crystal device 200 (the plane region of each dot 55). Also, the first wire 56 extends in the X-axis direction, and the second wire 66 extends in the Y-axis direction. The TFD element 60 is disposed in the vicinity of the intersection at which the first wire 56 and the second wire 66 intersect each other. A color filter 22 and a reflective polarization layer 39a are formed to cover the entire surface of the sub-pixel region on the plane. Also, a columnar spacer 40 is mounted in the sub-pixel region.

The common electrode (first electrode) 69 includes a base end part 69a, which extends in the X-axis direction, and two band-shaped electrodes 69c and 69c, which are extend from the X-axis directional center of the base end part 69a and the tip end of the base end part 69a to the +Y side, respectively. Also, the base end part 69a of the common electrode 69 is electrically connected to the first wire 56, which extends in the Y-axis direction, at the +X side end thereof.

The pixel electrode (second electrode) 9 includes a base end part 59a, which extends from the TFD element 60 in the X-axis direction, and two band-shaped electrodes 69c and 69c, which are extend from the tip end of the base end part 59a located at the side opposite to the TFD element 60 and from the vicinity of the TFD element 60 to the −Y side, respectively. Also, the ends of the band-shaped electrode 59c and 59c located at the side opposite to the base end part 59a are electrically connected to a capacitor electrode 59b, which is formed in the planar shape of a rectangle.

The two band-shaped electrodes 59c and 59c of the pixel electrode 9 are disposed between the two band-shaped electrodes 69c and 69c of the common electrode 69 and between the band-shaped electrode 69c located at the middle of the drawing and the first wire 56, respectively. The band-shaped electrodes 59c and 59c extend in parallel with the band-shaped electrodes 69c. The +X side end of the base end part 59a is electrically connected to the TFD element 60.

Also, the capacitor electrode 59b is disposed such that the capacitor electrode 59b overlaps with the base end part 69a of the common electrode 69 on the plane. The capacitor electrode 59b and the base end part 69a together constitute the maintenance capacitor 52.

The TFD element 60 is constructed with the first electrode 63, which is formed in the shape of a rectangle lengthened in the Y-axis direction, the second wire 66, which intersects the first electrode 63, and the base end part 59a of the pixel electrode 9. More specifically, the TFD element 60 includes a first element part 61, which is formed at the intersection at which the first electrode 63 and the second wire 66 intersect each other, and a second element part 62, which is formed at the intersection at which the first electrode 63 and the base end part 59a intersect each other. The first element part 61 and the second element part 62 are connected to each other back to back (in electrically opposite directions). In other words, the TFD element 60 is constructed in a back-to-back structure.

Referring now to FIG. 10, the liquid crystal device 200 includes an element substrate (first substrate) 110 and an opposite substrate (second substrate) 120, which are opposite to each other while the liquid crystal layer 50 is disposed between the element substrate 110 and the opposite substrate 120.

The element electrode 110 includes a light-transmissive substrate body 10A, which is made of glass or quartz. The first electrode 63, which is made of tantalum or tantalum alloy, the first wire 56, and the common wire 69 are formed on the substrate body 10A. The surface of the first electrode 63 is covered by an element insulation film 63a, which is made of a tantalum oxide, for example. Also, a wire insulation film 56a, which is made of a tantalum oxide, for example, is formed at the surface of the first wire 56, and a capacitor insulation film 69d, which is made of a tantalum oxide, for example, is formed at the surface of the common electrode 69. According to the second embodiment of the invention, the element insulation film 63a is thinner than the wire insulation film 56a and the capacitor insulation film 69d, and the wire insulation film 56a and the capacitor insulation film 69d have almost the same film thickness.

The second wire 66, which is made of chrome, for example, is formed at the wire insulation film 56a such that the second wire extends while intersecting the covered first wire 56, and the first element part 61 is formed at the position at which the second wire 66 and the first electrode 63 are opposite to each other via the element insulation film 63a. The first wire 56 and the second wire 66 are insulated by the wire insulation film 56a, which covers the first wire 56.

Also, the second element part 62 is formed at the position at which the base end part 59a of the pixel electrode 9 and the first electrode 63 are opposite to each other via the element insulation film 63a. The capacitor electrode 59b is formed at the capacitor insulation film 69d of the base end part 69a of the common electrode 69. The maintenance capacitor 52 uses the base end part 69a and the capacitor electrode 59b as its electrode and the capacitor insulation film 69d as its dielectric film.

On the entire surface of the substrate body 10A, which covers the second wire 66, the pixel electrode 9, the common electrode 69, is formed an orientation film 18, which is made of poly imide. Also, a polarization panel 14 is disposed at the outer surface of the substrate body 10A (at the side opposite to the liquid crystal layer 50).

The opposite substrate 120 includes a substrate body 20A, a reflective polarization layer 39 wholly formed at the inner surface of the substrate body 20A (the liquid crystal layer 50 side), a color filter 22 formed on the reflective polarization layer 39, and an orientation film 28, which is made of poly imide and covers the color filter 22. At the outer surface of the substrate body 20A (the side opposite to the liquid crystal layer 50) is disposed a polarization panel 24.

Figure 11A:
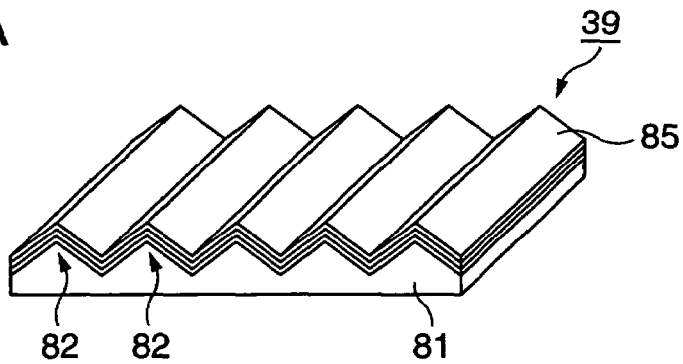
FIG. 11A is a perspective view showing a reflective polarization layer.
Figure 11B:
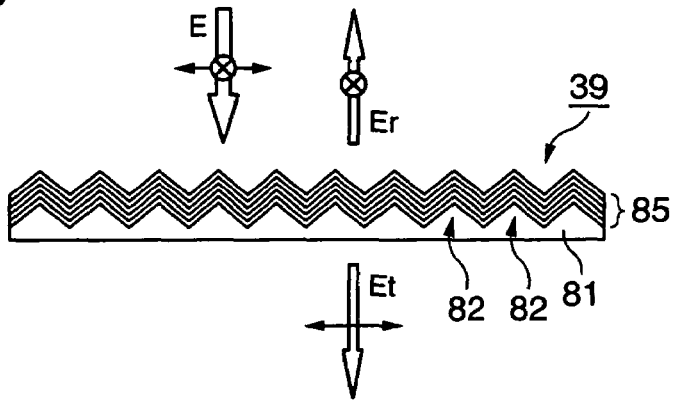
FIG. 11B is a side view showing the reflective polarization layer.

FIG. 11A is a perspective view showing the reflective polarization layer 39, and FIG. 11B is a side view illustrating the operation of the reflective polarization layer 39.

As shown in FIG. 11A, the reflective polarization layer 39, which is included in the liquid crystal device 200 according to the second embodiment of the invention, includes a prism array 81 formed on the substrate body 20A, which is made of thermosetting or photo-curable transparent resin, such as acrylic acid resin, and a dielectric interference film 85 formed by alternately stacking two kinds of dielectric films having different indexes of refraction.

The prism array 81 includes a plurality of protrusions, which are formed in the shape of a triangular prism and which has two sloping surfaces. The plurality of protrusions 82 are successively formed by periods, by which the prism array is constructed in the sectional shape of a chopping wave. The dielectric interference film 85 is formed by alternately stacking two kinds of dielectric films having different indexes of refraction in the shape corresponding to the sloping surfaces of the protrusions 82 (a so-called three-dimensional photonic crystal layer). For example, $TiO_2$ film and $SiO_2$ films may be alternately stacked in a 7-layered structure.

Although not shown in FIGS. 11A and 11B, the upper surface of the dielectric interference film 85 is covered by a resin layer, and therefore, the upper surface of the dielectric interference film 85 is even. According to the second embodiment of the invention, the reflective polarization layer 39 is covered to form the color filter 22. Consequently, it is possible that the surface of the dielectric interference film 85 is evened by the color filter 22.

As described above, the dielectric interference film 85 formed on the prism array has anisotropy as well as an optical transfer characteristic. When light (natural light) E is incident on the dielectric interference film 85 from the above, as shown in FIG. 11B, the dielectric interference film 85 reflects the polarized light component parallel with the extension direction of the protrusions 82, and transmits the polarized light component perpendicular to the extension direction of the protrusions 82. That is to say, the reflective polarization layer 39 shown in FIGS. 9A and 10 has a reflection axis, which is parallel with the extension direction of the protrusions 82, and a transmission axis, which is perpendicular to the extension direction of the protrusions 82.

In the liquid crystal device 200 according to the second embodiment of the invention, the linear polarized light, which is parallel with the reflection axis of the reflective polarization layer 39, is incident from the back light 90 side to perform transmissive display. As shown in FIG. 9B, the transmission axis 155 of the polarization panel 24 is perpendicular to the transmission axis 159 of the reflective polarization layer 39, and the transmission axis 155 of the polarization panel 24 is approximately parallel with the reflection axis of the reflective polarization layer 39 (the extension direction of the protrusions 82). Also, the transmission axis 153 of the polarization panel 14 and the rubbing direction 151 of the orientation films 18 and 28 are parallel with the transmission axis 159 of the reflective polarization layer 39.

The film thickness of each of the dielectric films constituting the dielectric interference film 85 is approximately 10 nm to 100 nm, and the total film thickness of the dielectric interference film 85 is approximately 300 nm to 1 μm. The height of the protrusions 82 of the prism array 81 is 0.5 μm to 3 μm, and the pitch between the neighboring protrusions 82 and 82 is approximately 1 μm to 6 μm. As the material of the dielectric film, $Ta_2O_5$ and Si may be used in addition to $TiO_2$ and $SiO_2$.

Furthermore, the stacking pitch of the dielectric films constituting the dielectric interference film 85 and the pitch of the protrusions 82 may be appropriately adjusted to the optimum value in response to the aimed characteristics of the reflective polarization layer 39. That is to say, the transmission rate (the reflection rate) of the reflective polarization layer 39 with the above-described construction can be controlled by the number of the stacked dielectric films constituting the dielectric interference film 85. When the number of the stacked dielectric films is decreased, the transmission rate of the linear polarized light parallel with the reflection axis (the extension direction of the protrusions 82) is increased, and the reflection rate of the linear polarized light is decreased. When the dielectric films are stacked more than a predetermined number, however, almost of the linear polarized light parallel with the reflection axis is reflected. In the reflective polarization layer 39 according to the second embodiment of the invention, the dielectric interference film 85 is adjusted such that approximately 70% of the linear polarized light parallel with the reflection axis is reflected, and the remainder of the linear polarized light, i.e., approximately 30% of the linear polarized light is transmitted.

Figure 12:
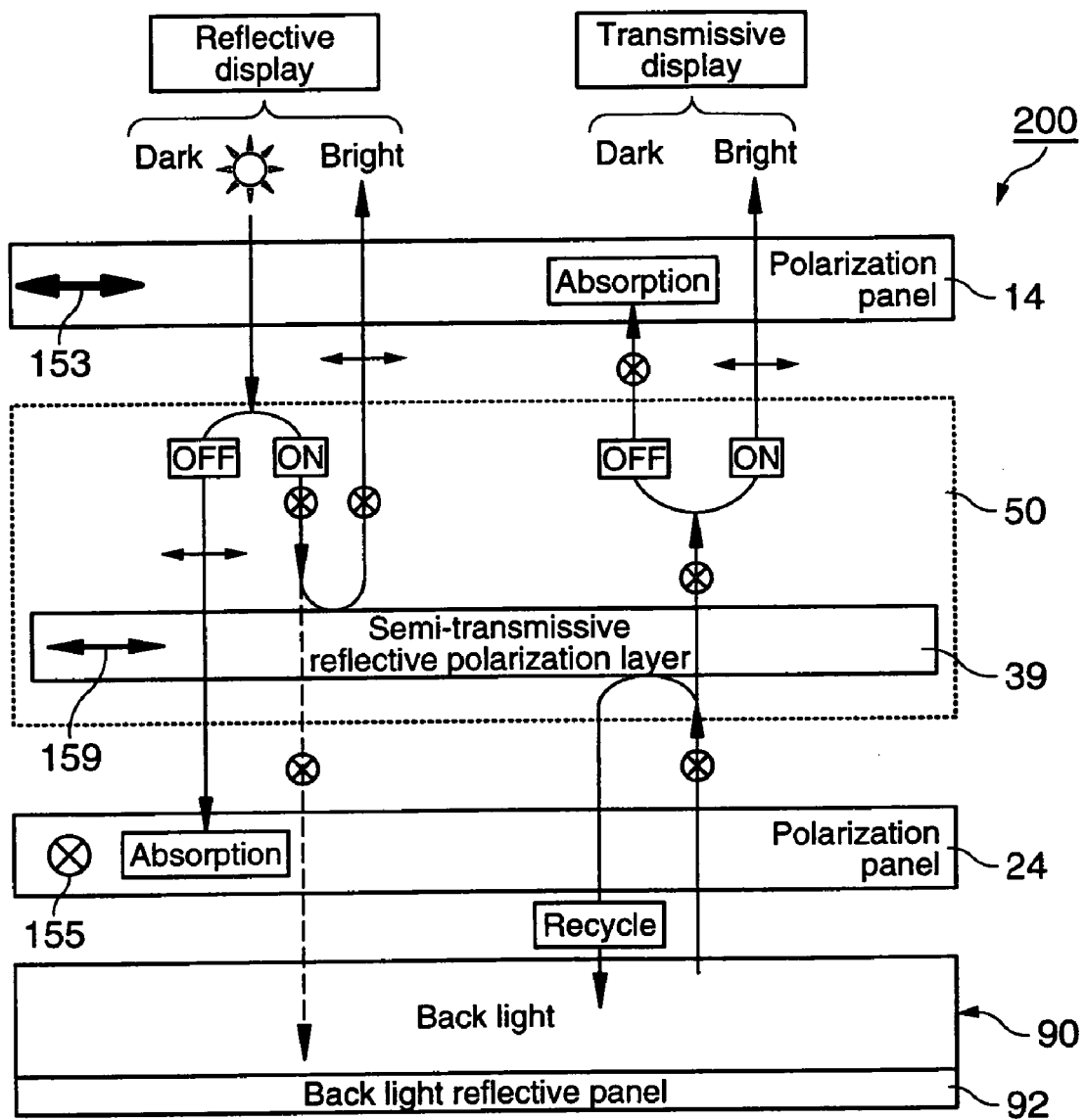
FIG. 12 is a view illustrating the operation of the liquid crystal device according to the second embodiment of the invention.

Next, the operation of the liquid crystal device 200 will be described with reference to FIG. 12. The polarization panel 14, the liquid crystal layer 50, the reflective polarization layer 39, the polarization panel 24, and the back light 90, which are necessary for the following description of the operation of the liquid crystal device, are shown in FIG. 12 in order from the above.

First, the transmissive display (the transmission mode) shown in the right side of the FIG. 12 will be described.

In the liquid crystal device 200, the light emitted from the back light 90 is transmitted through the polarization panel 24, and is converted into a linear polarized light, which is parallel with the transmission axis 155 of the polarization panel 24. Subsequently, the linear polarized light is incident on the reflective polarization layer 39. A portion (approximately 30%) of the incident light, which is the linear polarized light parallel with the reflection axis (the optical axis perpendicular to the transmission axis 159) of the reflective polarization layer 39, is transmitted through the reflective polarization layer 39, and is incident on the liquid crystal layer 50. When the liquid crystal layer 50 is on (the selected voltage is applied between the pixel electrode 9 and the common electrode 69), the incident light is given a predetermined phase difference (λ/2) by the liquid crystal layer 50, and is converted into a linear polarized light, which is parallel with the transmission axis 153 of the polarization panel 14, whereby the light transmitted through the polarization panel 14 is recognized as a display light, and therefore, the corresponding dot is brightly displayed.

When the liquid crystal layer 50 is off (the selected voltage is not applied between the pixel electrode 9 and the common electrode 19), on the other hand, the light, which is transmitted through the reflective polarization layer 39 and is incident on the liquid crystal layer 50, reaches the polarization panel 14 while the polarized state of the incident light is maintained, and is absorbed into the polarization panel 14, which has an absorption axis (an optical axis perpendicular to the transmission axis 153) parallel with the incident light, whereby the corresponding dot is darkly displayed.

Furthermore, the light reflected by the reflective polarization layer 39, which is a portion of the light transmitted through the polarization panel 24 and reflected by the reflective polarization layer 39, is transmitted again through the polarization panel 24, and is then returned to the back light 90 side. The returned light is reflected by the reflective panel 92 of the back light 90, and is then directed again to the liquid crystal panel side such that the light is reused as an illumination light.

Next, the reflective display shown in the left side of the FIG. 12 will be described.

The light incident on the polarization panel 14 from the above (the outside) is transmitted through the polarization panel 14, and is converted into a linear polarized light, which is parallel with the transmission axis 153 of the polarization panel 14. Subsequently, the linear polarized light is incident on the liquid crystal layer 50. At this time, when the liquid crystal layer 50 is on, the incident light is given a predetermined phase difference (λ/2) by the liquid crystal layer 50, and is incident on the reflective polarization layer 39. As shown in FIG. 9B, the reflective polarization layer 39 has the transmission axis 159, which is parallel with the transmission axis 153 of the polarization panel 24, and the reflection axis, which is perpendicular to the transmission axis 153 of the polarization panel 24. Consequently, a portion (approximately 30%) of the light, which is transmitted through the liquid crystal layer 50, which is on, and is incident on the reflective polarization layer 39, is reflected while the polarized state of the light is maintained, and the remainder (approximately 70%) of the light is transmitted through the reflective polarization layer 39. The light, which is reflected by the reflective polarization layer 39 and is then incident on the liquid crystal layer 50 again, is returned to its polarized state at the time of incidence (the linear polarized light parallel with the transmission axis of the polarization panel 24) by the operation of the liquid crystal layer 50, and is then incident on the polarization panel 24, whereby the reflected light, which is transmitted through the polarization panel 24, is recognized as a display light, and therefore, the corresponding dot is brightly displayed.

On the other hand, the linear polarized light transmitted through the reflective polarization layer 39 is transmitted through the polarization panel 24, which has the transmission axis 155 parallel with the polarization direction thereof, and is then incident on the back light 90. The light incident on the back light 90 is reflected by the reflective panel 92, and is then returned to the liquid crystal layer 50 side. A portion of the light is transmitted through the reflective polarization layer 39, and is then incident on the liquid crystal layer 50 such that the light is used as a display light of the bright display. In the liquid crystal device 200 according to the second embodiment of the invention, although the reflection rate of the linear polarized light parallel with the reflection axis of the reflective polarization layer 39 is set to approximately 30%, the light transmitted through the reflective polarization layer 39 and returned to the back light 90 side is also used as the display light. Consequently, bright reflective display is possible.

When the liquid crystal layer 50 is off, on the other hand, the light incident on the liquid crystal layer 50 from the polarization panel 14 is incident on the reflective polarization layer 39 while the polarized state of the light is maintained, and is transmitted through the reflective polarization layer 39, which has the transmission axis 159 parallel with the light. Subsequently, the light is absorbed by the polarization panel 24, which has the absorption axis parallel with the light, whereby the corresponding dot is darkly displayed.

The liquid crystal device 200 with the above-described construction is provided with the pixel switching elements and the TFD elements 60. Consequently, the liquid crystal device 200 can be easily manufactured, and the manufacturing costs of the liquid crystal device 200 are reduced. Furthermore, the maintenance capacitor is disposed in each of the dots. Consequently, even when the liquid crystal capacitor is decreased as the definition of the pixel is highly increased, excellent maintenance characteristics are obtained, and therefore, high-quality display is possible.

Also, the thickness of the liquid crystal layer 50 in the sub-pixel region is uniform in the same manner as the liquid crystal device according to the previously described first embodiment of the invention. Consequently, nonuniformity of the drive voltage in the sub-pixel region does not occur, and therefore, high-quality display is possible. Furthermore, it is not necessary to form steps in the sub-pixel region as in the multi-gap structure. Consequently, disorder of the liquid crystal orientation due to the formation of such steps is prevented, and therefore, the reliability of the liquid crystal device is highly improved.

Third Embodiment

Now, a liquid crystal device according to a third embodiment of the invention will be described with reference to the associated drawings. The liquid crystal device according to the third embodiment of the invention is a liquid crystal device adopting a fringe field switching (FFS) mode, which is a kind of horizontal electric field mode in which an electric field is applied to a liquid crystal in the substrate surface direction, i.e., a horizontal electric field is applied to the liquid crystal, to control the orientation of the liquid crystal, whereby picture display is performed. Also, the liquid crystal device according to the second embodiment of the invention is a color liquid crystal device having a color filter on a substrate wherein three dots that output three colored lights, such as red, green, and blue, respectively, constitute a pixel. Consequently, a display region having the smallest display unit is referred to as "a sub-pixel region," and a display region including a set of dots (R, G, and B) is referred to as "a pixel region."

Figure 13A:
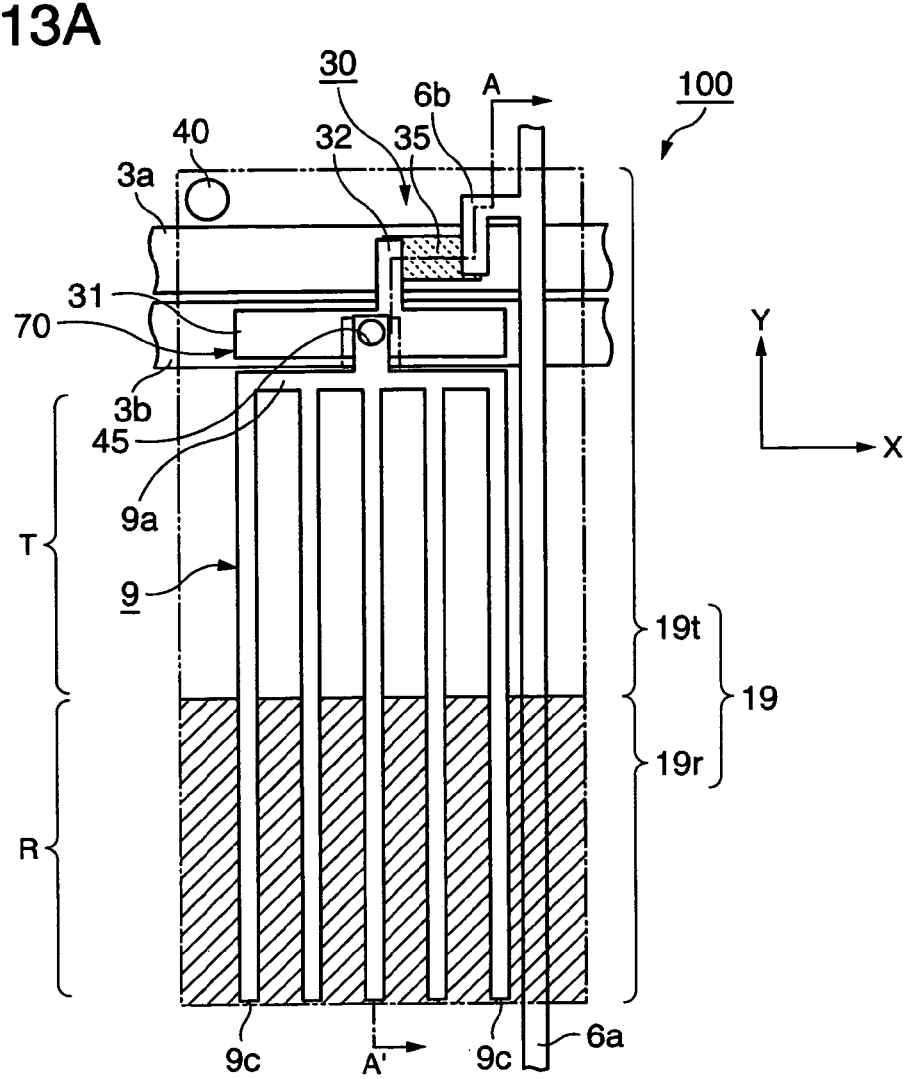
FIG. 13A is a plan view showing an arbitrary sub-pixel region of a liquid crystal device according to a third embodiment of the invention.
Figure 13B:
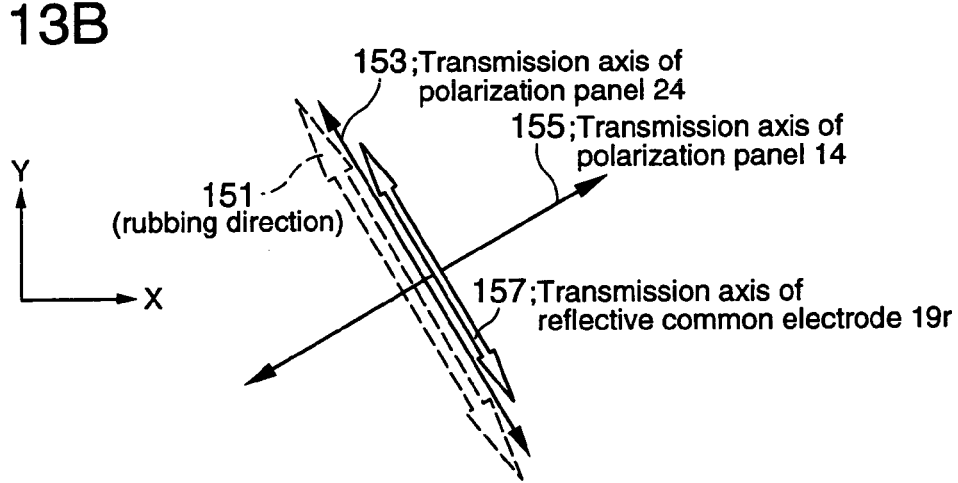
FIG. 13B is a view showing the arrangement of optical axes of the arbitrary sub-pixel region of the liquid crystal device according to the third embodiment of the invention.
Figure 14:
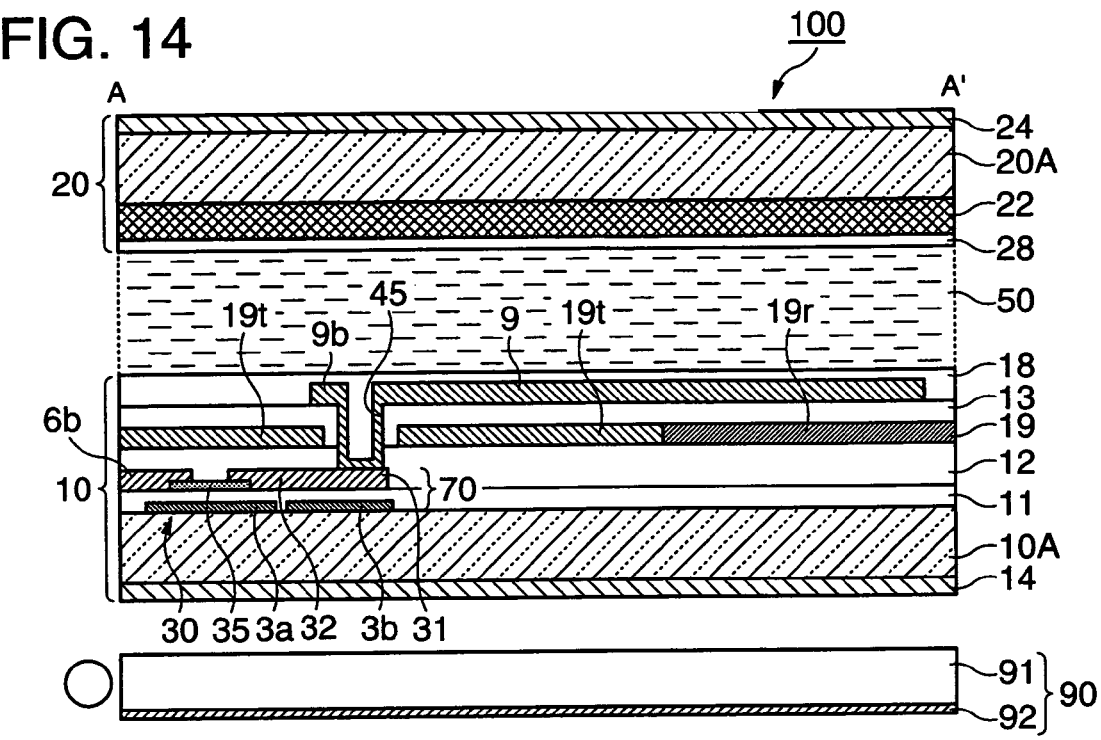
FIG. 14 is a sectional view taken along line A-A' of FIG. 13A.

The circuit diagram of a plurality of sub-pixel regions, which are formed in the shape of a matrix, constituting the liquid crystal device according to the second embodiment of the invention is the same as FIG. 1, with reference to which the liquid crystal device according to the first embodiment of the invention was previously described. FIG. 13A is a plan view showing an arbitrary sub-pixel region of the liquid crystal device 100, and FIG. 13B is a view showing the arrangement of optical axes of optical elements constituting the liquid crystal device 100. FIG. 14 is a sectional view taken along line A-A' of FIG. 13A.

In the respective drawings, layers and members are shown in different scales to enlarge the layers and the members on the respective drawings such that the layers and the members can be recognized.

As shown in FIG. 1, TFTS 30 for performing switching control between pixel electrodes 9 are formed at a plurality of sub-pixel regions, which are formed in the shape of a matrix to constitute the picture display region of the liquid crystal device 100, respectively. Data lines 6a extending from a data line drive circuit 101 are electrically connected to sources of the TFTS 30. The data line drive circuit 101 supplies picture signals S1, S2, . . . , and Sn to the respective pixels via the data lines 6a. The picture signals S1 to Sn may be sequentially supplied to the pixels in the order of the associated lines. Alternatively, the data lines 6a may be divided into groups such that the neighboring data lines 6a paired off into couples, and then the picture signals may be sequentially supplied to the pixels in groups.

Also, scanning lines 3a extending from a scanning line drive circuit 102 are electrically connected to gates of the TFTS 30. Scanning signals G1, G2, . . . , and Gm, which are supplied in pulses to the scanning lines 3a from the scanning line drive circuit 102 in a predetermined timing, are sequentially applied to the gates of the TFTs 30 in the order of the associated lines. The pixel electrodes 9 are electrically connected to drains of the TFTs 30, respectively. The TFTs 30, which are switching elements, are turned on for a predetermined period of time, as the scanning signals G1, G2, . . . , and Gm are input to the TFTs 30, and therefore, the picture signals S1, S2, . . . , and Sn, which are supplied from the data lines 6a, are written into the pixel electrodes 9 in a predetermined timing.

The picture signals S1, S2, . . . , and Sn with a predetermined level, which are written into the liquid crystal via the pixel electrodes 9, are maintained between the pixel electrodes 9 and a common electrode opposite to the pixel electrodes 9 via the liquid crystal for a predetermined period of time. Here, accumulation capacitors 70 are provided in parallel with liquid crystal capacitors, which are formed between the pixel electrodes 9 and the common electrode in order to prevent leakage of the maintained picture signals. The accumulation capacitors 70 are disposed between the drains of the TFTs 30 and capacitor lines 3b.

Next, the structure of the liquid crystal device 100 will be described in detail with reference to FIGS. 13A, 13B, and 14. As shown in FIG. 14, the liquid crystal device 100 includes a liquid crystal layer 50 disposed between a TFT array substrate (first substrate) 10 and an opposite substrate (second substrate) 20. The liquid crystal layer 50 is sealed between the substrates 10 and 20 by a sealing member (not shown), which is disposed along the outer edge of the region at which the substrates 10 and 20 are opposite to each other. At the rear surface of the TFT array substrate 10 (the lower surface in the drawing) is disposed a back light (a lighting unit) 90 including a light guide panel 91 and a reflective panel 92.

As shown in FIG. 13A, a pixel electrode (second electrode) 9, which is approximately formed in the planar shape of a rake (in the planar shape of the teeth of a comb) and which is elongated in the Y-axis direction, and a common electrode (first electrode) 19, which is formed in the planar shape of a plane and overlaps with the pixel electrode 9 on the plane, are disposed at the sub-pixel region of the liquid crystal device 100. At the left-upper corner of the sub-pixel region is mounted a columnar spacer 40 for spacing the TFT array substrate 10 and the opposite substrate 20 a predetermined distance from each other.

The pixel electrode 9 includes a plurality (5 in the drawing) of pixel electrode parts 9c, which extend in the Y-axis direction, a base end part 9a, which is connected to the respective ends of the pixel electrode parts 9c at the +Y side thereof and extends in the X-axis direction, and a contact part 9b extending from the X-axis directional center of the base end part 9a toward the +Y side.

In the pixel region shown in FIG. 13A, the common electrode 19 is divided into a transparent common electrode 19t and a reflective common electrode 19r. In the overall picture display region, the transparent common electrodes 19t, which extend in the X-axis direction, and the reflective common electrodes 19r, which extend in the X-axis direction, are alternately arranged in the Y-axis direction. According to the third embodiment of the invention, the transparent common electrode 19t is a conductive film, which is made of a transparent conductive material, such as indium tin oxide (ITO), and the reflective common electrode 19r is a reflective polarization layer made of a light-reflective metal film having a minute slit structure, which will be described below in detail.

The data line 6a, which extends in the X-axis direction, the scanning line 3a, which extends in the Y-axis direction, and the capacitor line 3b, which extends in parallel with the scanning line 3a while being adjacent to the scanning line 3a, are formed at the TFT 30. The TFT 30 is disposed in the vicinity of the intersection between the data line 6a and the scanning line 3a. The TFT 30 includes a semiconductor layer 35 made of amorphous silicon, which is partially formed in the plane region of the scanning line 3a, a source electrode 6b formed such that the source electrode 6b partially overlaps with the semiconductor layer 35 on the plane, and a drain electrode 32. The scanning line 3a serves as a gate electrode of the TFT 30 at the position at which the scanning line 3a partially overlaps with the semiconductor layer 35 on the plane.

The source electrode 6b of the TFT 30 diverges from the data line 6a and extends to the semiconductor layer 35 such that the source electrode 6b is approximately formed in the planar shape of a reverse L. The drain electrode 32 of the TFT 30 extends toward the −Y side such that the drain electrode 32 is electrically connected to the capacitor electrode 31, which is approximately formed in the planar shape of a rectangle. At the capacitor electrode 31 is disposed a contact part 9b of the pixel electrode 9, which extends from the −Y side. A pixel contact hole 45 is formed at the position at which the contact part 9b overlaps with the capacitor electrode 31 on the plane. The capacitor electrode 31 and the pixel electrode 9 are electrically connected to each other via the pixel contact hole 45.

Also, the capacitor electrode 31 is located in the plane region of the capacitor line 3b, and the accumulation capacitor 70, which uses the capacitor electrode 31 and the capacitor line 3b opposite to each other in the thickness direction as electrodes, are formed.

Referring to FIG. 14, the liquid crystal layer 50 is disposed between the TFT array substrate 10 and the opposite substrate 20, which are arranged opposite to each other. The TFT array substrate 10 includes a light-transmissive substrate body 10A, which is made of glass, quartz, or plastic. The scanning line 3a and the capacitor line 3b are formed at the inner surface of the substrate body 10A (the liquid crystal layer 50 side). The scanning line 3a and the capacitor line 3b are covered. In the inner surface of the substrate body 10A is also formed a gate insulation film 11, which is made of a transparent insulation film, such as silicon oxide.

The semiconductor layer 35, which is made of amorphous silicon, is formed on the gate insulation film 11. The source electrode 6b and the drain electrode 32 are disposed at the semiconductor layer 35 such that the source electrode 6b and the drain electrode 32 partially run on the semiconductor layer 35. The capacitor electrode 31 is integrally formed at the +X side of the drain electrode 32. The semiconductor layer 35 is opposite to the scanning line 3a via the gate insulation film 11. The scanning line 3a constitutes the gate electrode of the TFT 30 at the opposite region.

The capacitor electrode 31 is opposite to the capacitor line 3b via the gate insulation film 11. The accumulation capacitor 70 using the gate insulation film 11 as the dielectric film thereof is formed at the region at which the capacitor electrode 31 and the capacitor line 3b are opposite to each other.

The semiconductor layer 35, the source electrode 6b, the drain electrode 32, and the capacitor electrode 31 are covered to form a first interlayer insulation film 12, which is made of silicon oxide. The common electrode 19 including the transparent common electrode 19t, which is made of a transparent conductive material, such as indium tin oxide (ITO), and the reflective common electrode (the reflective polarization layer) 19r, which is mainly made of a reflective metal film, such as aluminum, is formed on the first interlayer insulation film 12. Consequently, in the liquid crystal device 100 according to the third embodiment of the invention, the region at which the plane region of the transparent common electrode 19t overlaps with the plane region including the pixel electrode 9, which is a portion of the single sub-pixel region shown in FIG. 13A, is a transmissive display region T, at which the light, which is incident from the back light 90 and is then transmitted through the liquid crystal layer 50, is modulated to perform a transmissive display. Also, the region at which the plane region of the reflective common electrode 19r overlaps with the plane region including the pixel electrode 9 is a reflective display region R, at which the light, which is incident on the opposite substrate 20 from the outside and is then transmitted through the liquid crystal layer 50, is reflected and modulated to perform a reflective display.

AS shown in FIGS. 13A and 14, the transparent common electrode 19t and the reflective common electrode 19r, which together constitute the common electrode 19, are separated from each other on the plane. However, it is possible that the transparent common electrode 19t extends to cover the reflective common electrode 19r. In this case, the transparent common electrode 19t is consistently located at the surface of the common electrode 19 opposite to the pixel electrode 9, and therefore, it is possible to uniform the electric field generated between the pixel electrode 9 and the common electrode 19 in the sub-pixel region.

The common electrode 19 is covered to form a second interlayer insulation film 13. The pixel electrode 9, which is made of a transparent conductive material, such as ITO, is formed on the second interlayer insulation film 13. The pixel contact hole 45 are formed through the first interlayer insulation film 12 and the second interlayer insulation film 13 such that the pixel contact hole 45 extends to the capacitor electrode 31. The contact part 9b of the pixel electrode 9 is partially located in the pixel contact hole 45. Consequently, the pixel electrode 9 and the capacitor electrode 31 are electrically connected to each other. Also, an opening is formed at the common electrode 19 in correspondence to the region at which the pixel contact hole 45 is formed. The common electrode 19 is not connected with the pixel electrode 9. On the second interlayer insulation film 13, which covers the pixel electrode 9, is formed an orientation film 18, which is made of poly imide.

On the other hand, a color filter 22 and an orientation film 28 are stacked at the inner surface of the opposite substrate 20 (the liquid crystal layer 50 side). At the outer surface of the opposite substrate 290 is disposed a polarization panel 24. In addition, a phase difference panel and other optical elements may be disposed at the outer surface of the opposite substrate 20.

It is preferable that the color filter 22 be divided into two kinds of regions having different chromaticity in the pixel region. Specifically, a first color material region is disposed in correspondence to the plane region of the transparent common electrode 19t constituting the transmissive display region, and a second color material region is disposed in correspondence to the plane region of the reflective common electrode 19r constituting the reflective display region. The chromaticity of the first color material region may be higher than that of the second color material region. In this case, the chromaticity of a display light is prevented from being changed between the transmissive display region, at which the display light is transmitted through the color filter 22 only once, and the reflective display region, at which the display light is transmitted through the color filter 22 twice. Consequently, the recognition of the reflective display and the transmissive display is uniform, and therefore, display quality is improved.

Figure 15A:
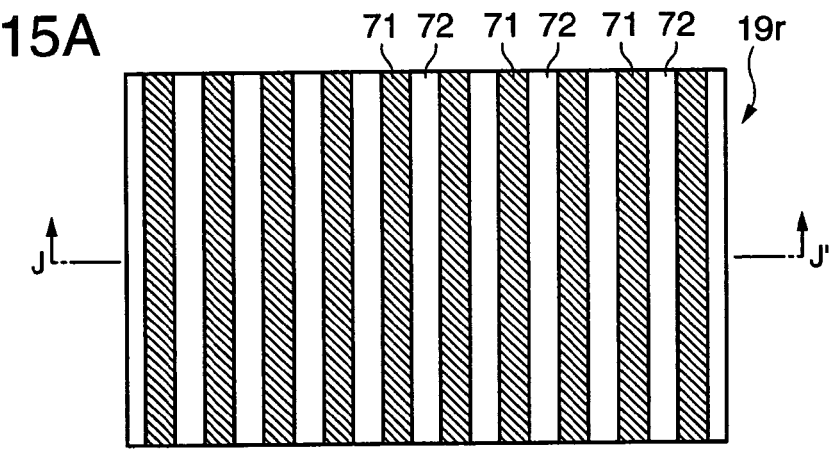
FIG. 15A is a plan view showing a reflective polarization layer.

Now, the structure and operation of the reflective common electrode 19r, which is the reflective polarization layer, will be described with reference to FIGS. 15A and 15B. FIG. 15A is a plan view showing the reflective common electrode 19r, and FIG. 15B is a sectional view taken along line J-J' of FIG. 15A.

Figure 15B:
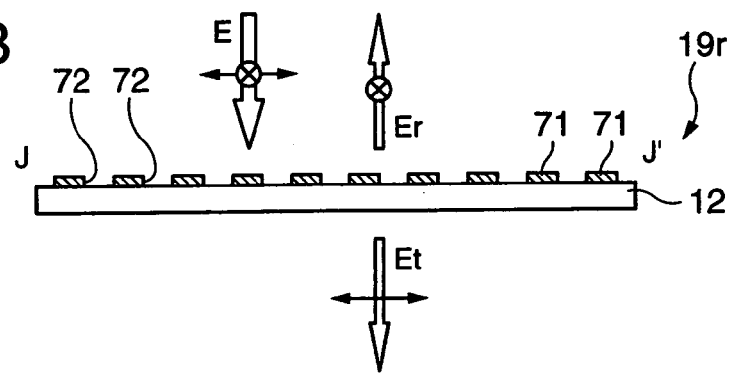
FIG. 15B is a side view showing the reflective polarization layer.

As shown in FIGS. 15A and 15B, the reflective common electrode 19r includes a metal film 71, which is made of light-reflective metal, such as aluminum. At the metal film 71 are formed a plurality of minute slits 72, which are formed in the planar shape of a stripe, at a predetermined pitch. The plurality of slits 72 are arranged in parallel with each other, and have the same width. The width of the slits 72 is approximately 30 nm to 300 nm, and the line width of the metal film 71, which is formed in the shape of a line as a result of forming the plurality of slits 72 at the predetermined pitch, is approximately 30 nm to 300 nm.

When light E is incident on the reflective common electrode 19r with the above-stated construction from the upper surface side, as shown in FIG. 15B, the polarized light component which is parallel with the longitudinal direction of the slits 72, is reflected as a reflected light Er, and the polarized light component which is parallel with the lateral direction of the slits 72, is transmitted as a transmitted light Et. In other words, the reflective common electrode 19r has a reflection axis, which is parallel with the extension direction of the slits 72, and a transmission axis, which is perpendicular to the reflection axis.

As shown in FIG. 13B, which is a view showing the arrangement of optical axes, a transmission axis 157 of the reflective common electrode 19r (the direction perpendicular to the extension direction of the slits 72) is located, such that the transmission axis 157 is parallel with a transmission axis 153 of the polarization panel 24 at the opposite substrate 20 side and is perpendicular to a transmission axis of the polarization panel 14 at the TFT array substrate 10 side, in the liquid crystal device 100. Also, in the liquid crystal device 100 according to the third embodiment of the invention, the orientation films 18 and 28 are rubbed in the same direction on the plane. The direction of the orientation films 18 and 28 is a rubbing direction 151 as shown in FIG. 13B. Consequently, the transmission axis 157 of the reflective common electrode 19r is located in parallel with the rubbing direction 151 of the orientation films 18 and 28.

Furthermore, the rubbing direction 151 is located at an angle of approximately 30 degrees to the pixel electrode parts 9c, which extend in parallel with the pixel arrangement direction (the Y-axis direction) of the liquid crystal device 100.

The liquid crystal device 100 with the above-stated construction is an FFS mode liquid crystal device. When the picture signal (voltage) is applied to the pixel electrode 9 via the TFT 30, an electric field is generated between the pixel electrode 9 and the common electrode 19 in the substrate surface direction (in the X-axis direction of FIG. 2), and the liquid crystal is driven by the generated electric field. The transmission rate/the reflection rate of each dot is changed to perform the picture display. As shown in FIG. 13B, the orientation film 18 and 28, which are opposite to each other while the liquid crystal layer 50 is disposed between the orientation film 18 and 28, are rubbed in the same direction on the plane. In the state that the voltage is not applied to the pixel electrode 9, the liquid crystal molecules constituting the liquid crystal layer 50 are oriented horizontally between the substrates 10 and 20 along the rubbing direction 151. Consequently, when the electric field generated between the pixel electrode 9 and the common electrode 19 is applied to the liquid crystal layer 50, the liquid crystal molecules are oriented along the line-lateral direction (the X-axis direction) of the pixel electrode part 9c shown in FIG. 13A. The liquid crystal device 100 performs bright and dark display using double refraction based on the difference in the oriented state of the liquid crystal molecules.

Furthermore, it is preferable that, when the liquid crystal device 100 is operated, the common electrode 19 be maintained at the constant voltage at which the voltage difference having a predetermined range occurs between the common electrode 19 and the pixel electrode 9. Alternatively, a pulse signal, which is synchronized with the scanning pulse input to the scanning line 3a, may be input.

Figure 16:
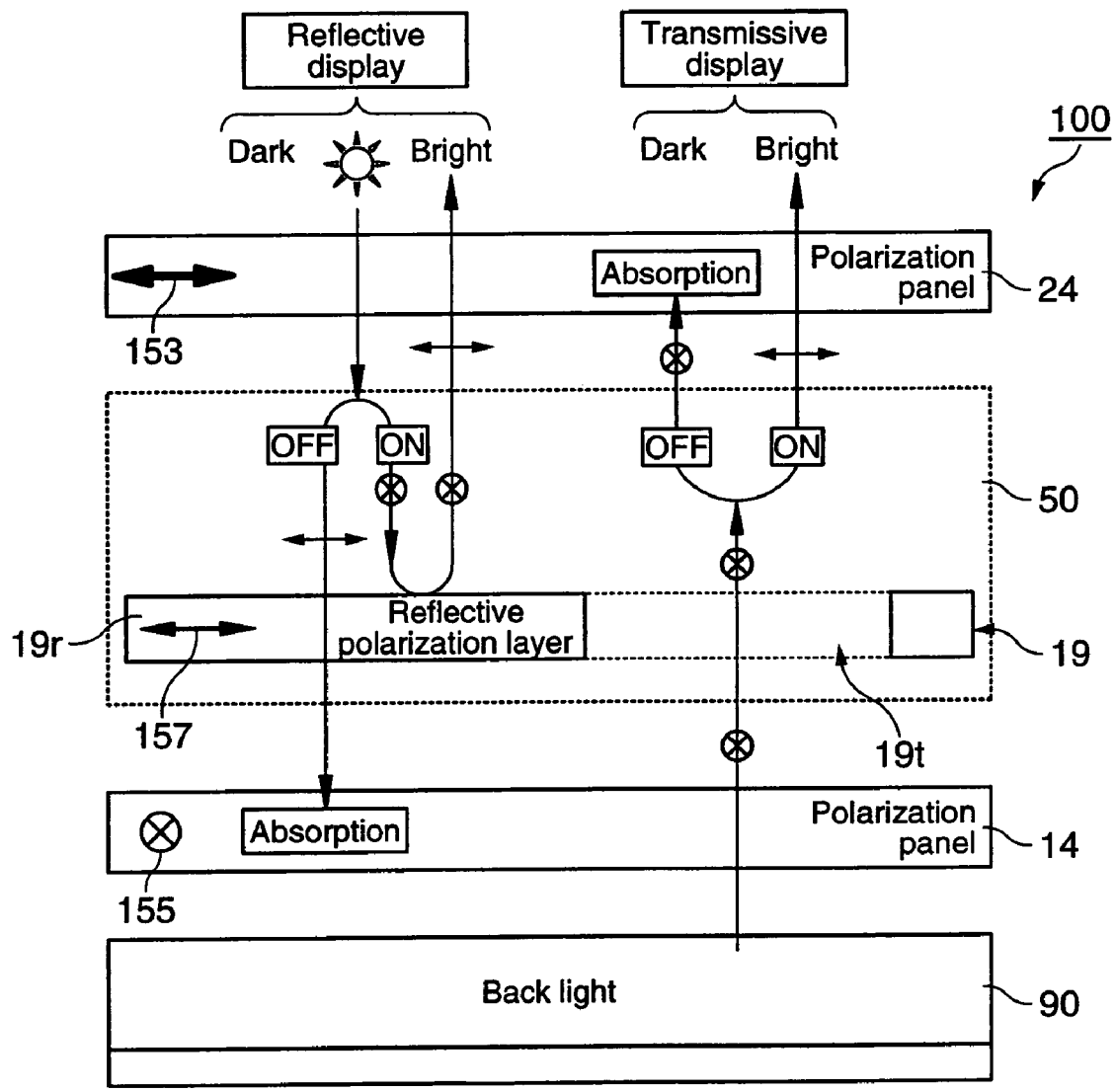
FIG. 16 is a view illustrating the operation of the liquid crystal device according to the third embodiment of the invention.

Next, the operation of the liquid crystal device 100 with the above-stated construction will be described with reference to FIG. 16. FIG. 16 is a view illustrating the operation of the liquid crystal device 100. The components of FIG. 16 are components extracted from those of FIG. 14, which are necessary for the following description. The polarization panel 24, the liquid crystal layer 50, the common electrode 19, the polarization panel 14, and the back light 90 are shown in FIG. 16 in order from the above.

First, the transmissive display (the transmission mode) shown in the right side of the FIG. 16 will be described.

In the liquid crystal device 100, the light emitted from the back light 90 is transmitted through the polarization panel 14, and is converted into a linear polarized light, which is parallel with the transmission axis 155 of the polarization panel 14. Subsequently, the linear polarized light is incident on the common electrode 19, is transmitted through the transparent common electrode 19t, and is incident on the liquid crystal layer 50. When the liquid crystal layer 50 is on (the selected voltage is applied between the pixel electrode 9 and the common electrode 19), the incident light is given a predetermined phase difference ($\lambda/2$) by the liquid crystal layer 50, and is converted into a linear polarized light, which is parallel with the transmission axis 153 of the polarization panel 24, whereby the light transmitted through the polarization panel 24 is recognized as a display light, and therefore, the corresponding dot is brightly displayed.

When the liquid crystal layer 50 is off (the selected voltage is not applied between the pixel electrode 9 and the common electrode 19), on the other hand, the incident light reaches the polarization panel 24 while the polarized state of the incident light is maintained, and is absorbed into the polarization panel 24, which has an absorption axis (an optical axis perpendicular to the transmission axis 153) parallel with the incident light, whereby the corresponding dot is darkly displayed.

Furthermore, the light transmitted through the polarization panel 14 and incident on the reflective common electrode 19r is reflected by the reflective common electrode 19r, which has the reflection axis parallel with the linear polarized light, and therefore, the light is not incident on the liquid crystal layer 50, but is returned to the back light 90 side.

Next, the reflective display shown in the left side of the FIG. 16 will be described.

The light incident on the polarization panel 24 from the above (from the outside) is transmitted through the polarization panel 24, and is converted into a linear polarized light, which is parallel with the transmission axis 153 of the polarization panel 24. Subsequently, the linear polarized light is incident on the liquid crystal layer 50. At this time, when the liquid crystal layer 50 is on, the incident light is given a predetermined phase difference ($\lambda/2$) by the liquid crystal layer 50, and is incident on the reflective common electrode 19r. As shown in FIG. 13B, the reflective common electrode 19r, which is the reflective polarization layer, has the transmission axis 157, which is parallel with the transmission axis 153 of the polarization panel 14, and the reflection axis, which is perpendicular to the transmission axis 153 of the polarization panel 14. Consequently, the light, which is transmitted through the liquid crystal layer 50, which is on, and is incident on the reflective common electrode 19r, is reflected while the polarized state of the light is maintained. The reflected light, which is incident on the liquid crystal layer 50 again, is returned to its polarized state at the time of incidence (the linear polarized light parallel with the transmission axis of the polarization panel 24) by the operation of the liquid crystal layer 50, and is incident on the polarization panel 24. As a result, the reflected light, which is transmitted through the polarization panel 24, is recognized as a display light, and therefore, the corresponding dot is brightly displayed.

When the liquid crystal layer 50 is off, on the other hand, the light incident on the liquid crystal layer 50 from the polarization panel 24 is incident on the reflective common electrode 19r while the polarized state of the light is maintained, and is transmitted through the reflective common electrode 19r, which has the transmission axis 157 parallel with the light. Subsequently, the light is absorbed by the polarization panel 14, which has the absorption axis parallel with the light, whereby the corresponding dot is darkly displayed.

Figure 17:
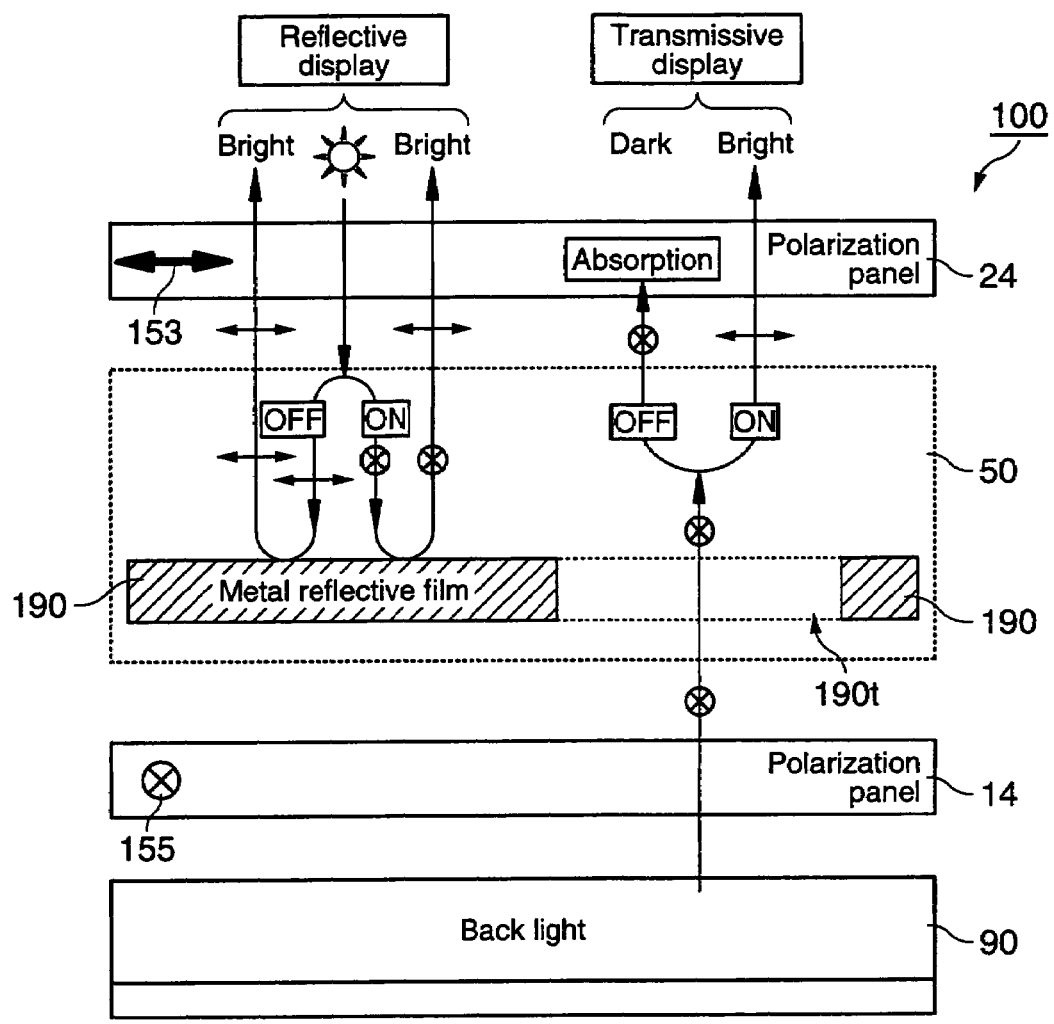
FIG. 17 is a view illustrating the operation of a liquid crystal device shown as a comparative example.

FIG. 17 is a view illustrating the operation of a liquid crystal device 100, which is a kind of FFS mode liquid crystal device, including a metal reflective film 190, which is made of aluminum, partially disposed in the sub-pixel region. That is to say, the liquid crystal device 100 is a combination of the FFS mode liquid crystal device and a related semi-transmissive reflective liquid crystal device. In the liquid crystal device 100, the region at which the metal reflective film 190 is formed in the sub-pixel region is a reflective display region, and the region at which an opening 190t formed at the metal reflective film 190 is formed is a transmissive display region.

As shown in FIG. 17, the liquid crystal device 100 is capable of performing the same bright and dark display as the liquid crystal device according to the invention in connection with the transmissive display. In connection with the reflective display, however, the liquid crystal device 100 performs only the bright display irrespective of the on/off state of the liquid crystal layer 50, and therefore, normal display is not possible. Also, it is possible to dispose a phase difference panel (λ/4 panel) between the polarization panel 24 and the liquid crystal layer 50 in the liquid crystal device 100 such that a circular polarized light can be incident on the liquid crystal layer 50 at the time of the reflective display. In the horizontal electric field mode liquid crystal device which is oriented in parallel in the substrate surface, however, the phase difference of the liquid crystal layer 50 is not changed by the electric field response as in the related vertical electric field mode liquid crystal device, but the direction of the optical axis of the liquid crystal layer 50 in the surface thereof is changed. Consequently, it is difficult to accomplish high display quality when the circular polarization mode is applied. In the circular polarization, when the phase difference given by the liquid crystal layer 50 is approximately λ/2, the light is emitted from the liquid crystal layer 50 in the same polarized state without dependence in the direction of the optical axis of the liquid crystal layer 50. Also, when the phase difference given by the liquid crystal layer 50 is not λ/2, it is difficult to accomplish high display quality in the reflective display and the transmissive display.

Also, a semi-transmissive reflective liquid crystal device wherein the thickness of the liquid crystal layer of the reflective display region is half that of the transmissive display region, a so-called multi-gap type semi-transmissive reflective liquid crystal device is known as the semi-transmissive reflective liquid crystal device. However, the drive voltage is greatly changed depending upon the thickness of the liquid crystal layer in the horizontal electric field mode liquid crystal device. For this reason, the reduction of the display quality due to the drive voltage difference between the reflective display region and the transmissive display region is hardly avoided, although the above-mentioned multi-gap structure is applied to the horizontal electric field mode liquid crystal device, and therefore, it is difficult to accomplish high-quality semi-transmissive reflective display.

On the contrary, the liquid crystal device 100 according to the third embodiment of the invention has the structure in which the reflective polarization layer (the reflective common electrode 19r) is partially disposed in the sub-pixel region. Consequently, high-contrast reflective display and transmissive display are accomplished without using the circular polarization mode or the multi-gap structure, and the semi-transmissive reflective liquid crystal device according to the third embodiment of the invention has high picture quality although the structure of the semi-transmissive reflective liquid crystal device is simplified. Also, the thickness of the liquid crystal layer in the sub-pixel region is uniform, and therefore, the drive voltage difference is not made between the transmissive display region T and the reflective display region R. Consequently, the display state is not changed in the reflective display and the transmissive display.

Also, in the liquid crystal device 100 according to the third embodiment of the invention, the reflective common electrode 19r for performing the reflective display is disposed at the TFT array substrate 10 side. Consequently, the reduction of the display quality due to the reflection of external light by the metal wires formed on the TFT 30 and the TFT array substrate 10 is effectively prevented. Furthermore, the pixel electrode 9 is made of a transparent conductive material. Consequently, diffused reflection of the external light, which is transmitted through the liquid crystal layer 50 and is incident on the TFT array substrate 10, by the pixel electrode 9 is prevented, and therefore, the visibility of the liquid crystal device 100 is highly increased.

Also, the reflective common electrode 19r used in the liquid crystal device according to the third embodiment of the invention is accurately formed on the interlayer insulation film 12, for example, by forming an aluminum film and patterning the aluminum film using a photolithography technology. Consequently, the reflective common electrode 19r can be appropriately used in a high-definition liquid crystal device having narrow sub-pixel regions.

Fourth Embodiment

Now, a liquid crystal device according to a fourth embodiment of the invention will be described with reference to FIGS. 18A to 20.

Figure 18A:
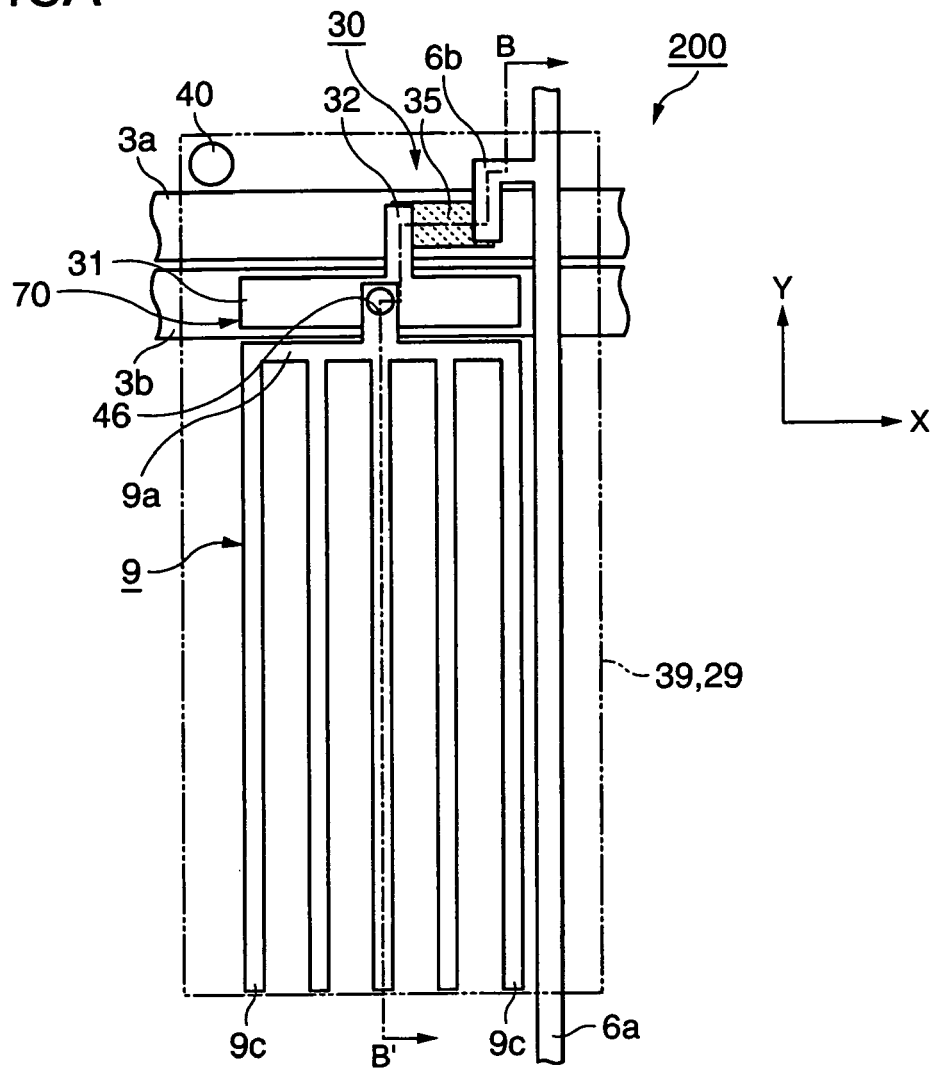
FIG. 18A is a plan view showing a sub-pixel region of a liquid crystal device according to a fourth embodiment of the invention.
Figure 18B:
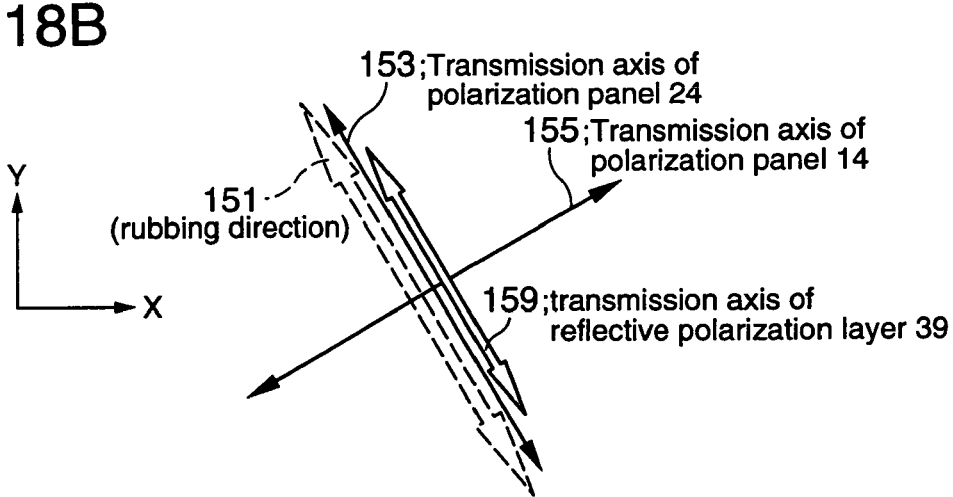
FIG. 18B is a view showing the arrangement of optical axes of the sub-pixel region of the liquid crystal device according to the fourth embodiment of the invention.
Figure 19:
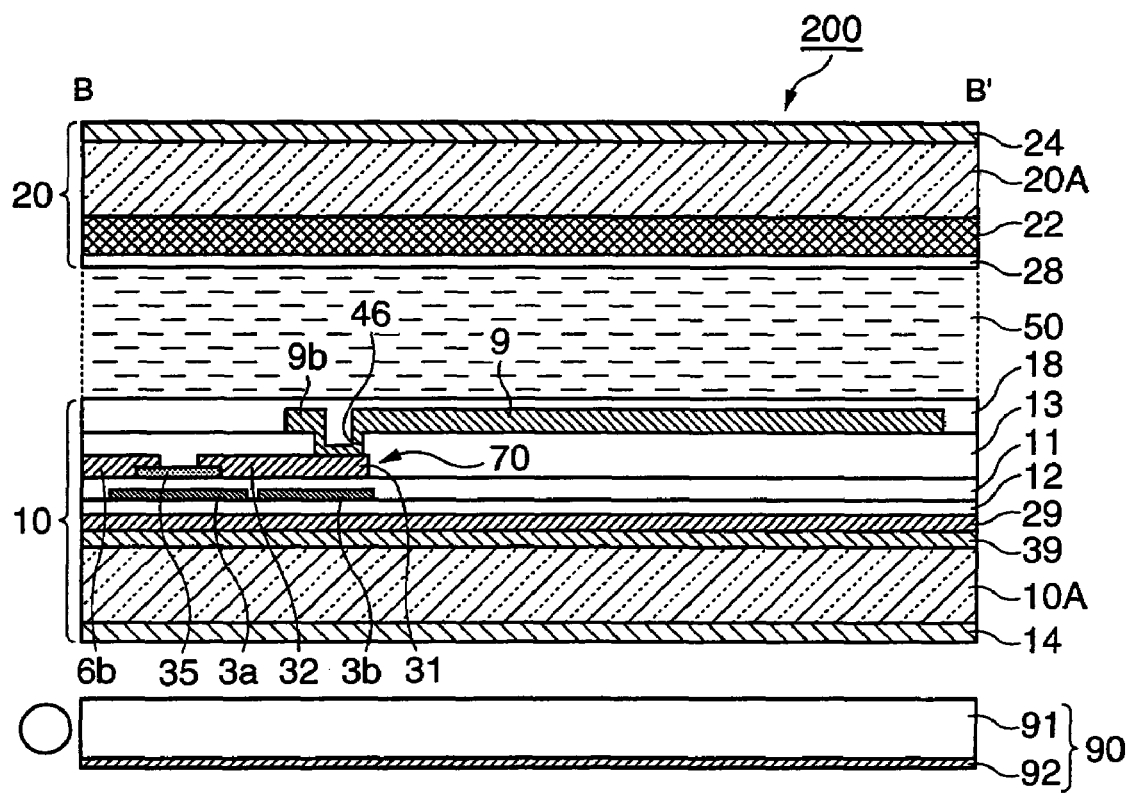
FIG. 19 is a sectional view taken along line B-B' of FIG. 18A.
Figure 20:
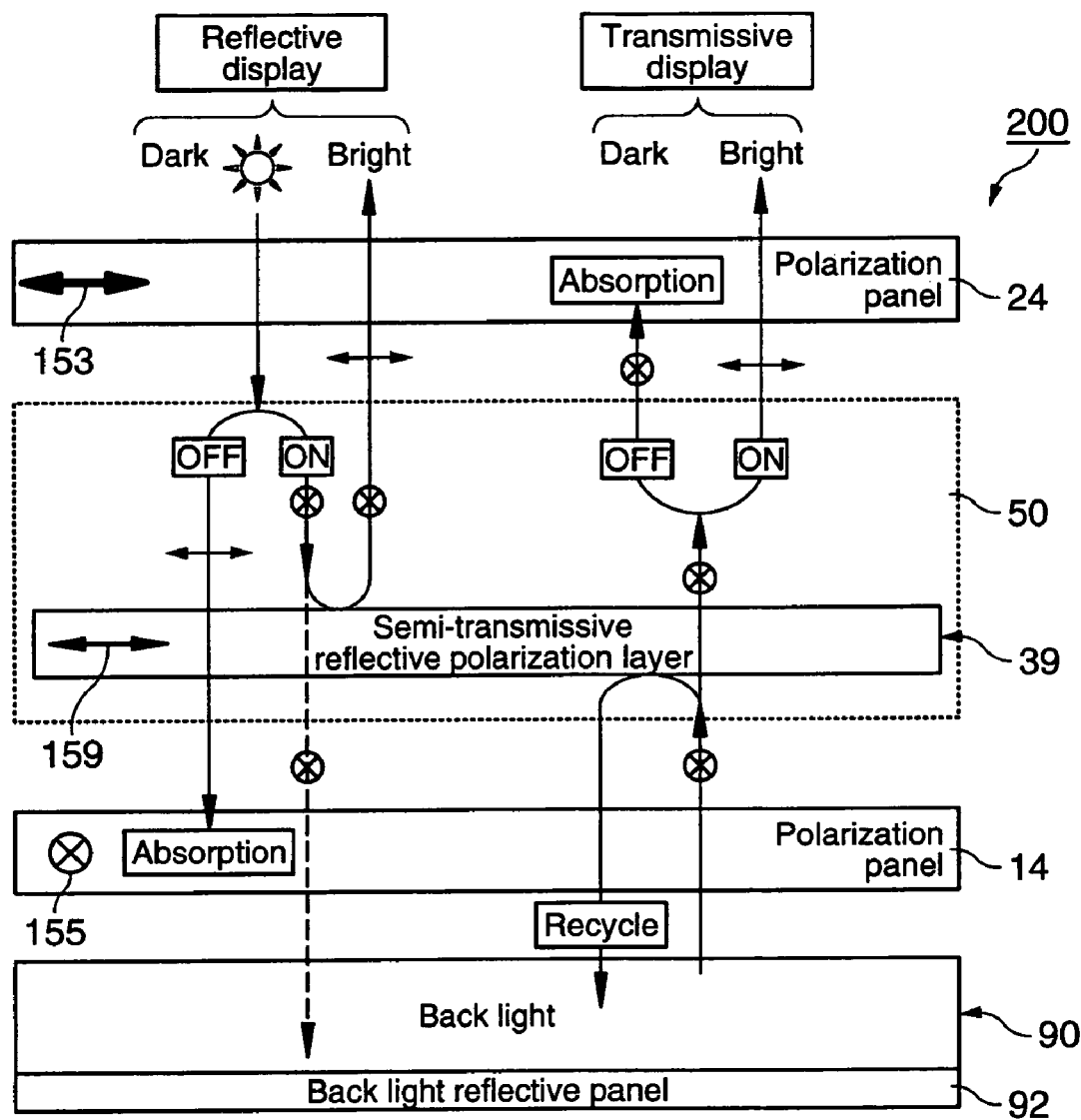
FIG. 20 is a view illustrating the operation of the liquid crystal device according to the fourth embodiment of the invention.

FIG. 18A is a plan view showing a sub-pixel region of a liquid crystal device 200 according to a fourth embodiment of the invention, and FIG. 18B is a view showing the arrangement of optical axes of the sub-pixel region of the liquid crystal device 200 according to the fourth embodiment of the invention. FIG. 19 is a sectional view taken along line B-B' of FIG. 18A. FIG. 20 is a view illustrating the operation of the liquid crystal device 200 according to the fourth embodiment of the invention.

The basic structure of the liquid crystal device 200 according to the fourth embodiment of the invention is identical to that of the liquid crystal device according to the previously described third embodiment of the invention. FIGS. 18A and 18b correspond to FIGS. 13A and 13B, respectively, with reference to which the liquid crystal device according to the third embodiment of the invention was previously described. FIGS. 19 and 20 correspond to FIGS. 14 and 16, respectively, with reference to which the liquid crystal device according to the third embodiment of the invention was previously described. Consequently, in the respective drawings, with reference to which the liquid crystal device according to the fourth embodiment of the invention is described, components of the liquid crystal device according to the fourth embodiment of the invention, which are identical to those of the liquid crystal device 100 according to the third embodiment of the invention, are indicated by the same reference numerals as those of the liquid crystal device 100 according to the third embodiment of the invention, and a detailed description thereof will not be given.

As shown in FIG. 18A, a pixel electrode (second electrode) 9 and a TFT 30 are disposed in a sub-pixel region of the liquid crystal device 200 according to the fourth embodiment of the invention. The TFT 30 is electrically connected to the pixel electrode 9 via a capacitor electrode 31. A drain electrode 32, which extends from the capacitor electrode 31, is electrically connected to a source electrode 6b, which diverges from a data line 6a extending in the Y-axis direction, at a semiconductor layer 35 constituting the TFT 30, which is made of amorphous silicon. At the rear surface of the semiconductor layer 35, a scanning line 3a, which extends in the X-direction, constitutes a gate electrode of the TFT 30 at the position at which the scanning line 3a overlaps with the semiconductor layer 35 on the plane. The capacitor electrode 31 and a capacitor line 3b, which overlaps with the capacitor electrode 31 on the plane and extends in the X-axis direction, constitute an accumulation capacitor 70 of the sub-pixel region.

Also, a reflective polarization layer 39 and a common electrode (first electrode) 29, both of which are formed in the planar shape of a plane, are disposed at the sub-pixel region shown in FIG. 18A.

Referring to FIG. 19, the liquid crystal device 200 includes a TFT array substrate (first substrate) 10 and an opposite substrate (second substrate) 20, which is opposite to the TFT array substrate 10 while a liquid crystal layer 50 is disposed between the TFT array substrate 10 and the opposite substrate 20. At the rear surface of the TFT array substrate 10 (the lower surface in the drawing) is disposed a back light 90. The structure of the opposite substrate 20 is identical to that of the third embodiment of the invention. Consequently, a detailed description of the structure of the opposite substrate 20 will not be given.

On a substrate body 10A of the TFT array substrate 10 is formed a reflective polarization layer 39, which is formed in the planar shape of a plane. The reflective polarization layer 39 is covered to form a common electrode 29, which is made of a transparent conductive material, such as ITO. The common electrode 29 is covered to form a first interlayer insulation film 12. The scanning line 3a and the capacitor line 3b are formed on the first interlayer insulation film 12. The scanning line 3a and the capacitor line 3b are covered to form a gate insulation film 11. The semiconductor layer 35, the source electrode 6b (the data line 6a), which is electrically connected to the semiconductor layer 35, and the drain electrode 32 (the capacitor electrode 31) are formed on the gate insulation film 11. The semiconductor layer 35, source electrode 6b, and the drain electrode 32 are covered to form a second Interlayer insulation film 13. The pixel electrode 9 is formed on the second interlayer insulation film 13. The pixel electrode 9 is covered to form an orientation film 18.

Through the second interlayer insulation film 13 is formed a pixel contact hole 46, which extends to the capacitor electrode 31. The capacitor electrode 31 is electrically connected to a contact part 9b (the pixel electrode 9) via the pixel contact hole 46.

As shown in FIG. 11A, with reference to which the second embodiment of the invention was previously described, the reflective polarization layer 39, which is included in the liquid crystal device 200 according to the fourth embodiment of the invention, includes a prism array 81 formed on the substrate body 10A, which is made of thermosetting or photo-curable transparent resin, such as acrylic acid resin, and a dielectric interference film 85 formed by alternately stacking two kinds of dielectric films having different indexes of refraction.

The prism array 81 includes a plurality of protrusions, which are formed in the shape of a triangular prism and which has two sloping surfaces. The plurality of protrusions 82 are successively formed by periods, by which the prism array is constructed in the sectional shape of a chopping wave. The dielectric interference film 85 is formed by alternately stacking two kinds of dielectric films having different indexes of refraction in the shape corresponding to the sloping surfaces of the protrusions 82 (a so-called three-dimensional photonic crystal layer). For example, $TiO_2$ film and $SiO_2$ films may be alternately stacked in a 7-layered structure.

Although not shown in FIGS. 11A and 11B, the upper surface of the dielectric interference film 85 is covered by a resin layer, and therefore, the upper surface of the dielectric interference film 85 is even. As described above, the dielectric interference film 85 formed on the prism array has anisotropy as well as an optical transfer characteristic. When light (natural light) E is incident on the dielectric interference film 85 from the above, as shown in FIG. 11B, the dielectric interference film 85 reflects the polarized light component parallel with the extension direction of the protrusions 82, and transmits the polarized light component perpendicular to the extension direction of the protrusions 82. That is to say, the reflective polarization layer 39 shown in FIGS. 18A and 19 has a reflection axis, which is parallel with the extension direction of the protrusions 82, and a transmission axis, which is perpendicular to the extension direction of the protrusions 82.

In the liquid crystal device 200 according to the fourth embodiment of the invention, the linear polarized light, which is parallel with the reflection axis of the reflective polarization layer 39, is incident from the back light 90 side to perform transmissive display. As shown in FIG. 18B, the transmission axis 155 of the polarization panel 14 is perpendicular to the transmission axis 159 of the reflective polarization layer 39, and the transmission axis 155 of the polarization panel 14 is approximately parallel with the reflection axis of the reflective polarization layer 39 (the extension direction of the protrusions 82). Also, the transmission axis 153 of the polarization panel 24 and the rubbing direction 151 of the orientation films 18 and 28 are parallel with the transmission axis 159 of the reflective polarization layer 39.

The film thickness of each of the dielectric films constituting the dielectric interference film 85 is approximately 10 nm to 100 nm, and the total film thickness of the dielectric interference film 85 is approximately 300 nm to 1 μm. The height of the protrusions 82 of the prism array 81 is 0.5 μm to 3 μm, and the pitch between the neighboring protrusions 82 and 82 is approximately 1 μm to 6 μm. As the material of the dielectric film, $Ta_2O_5$ and Si may be used in addition to $TiO_2$ and $SiO_2$.

Furthermore, the stacking pitch of the dielectric films constituting the dielectric interference film 85 and the pitch of the protrusions 82 may be appropriately adjusted to the optimum value in response to the aimed characteristics of the reflective polarization layer 39. That is to say, the transmission rate (the reflection rate) of the reflective polarization layer 39 with the above-described construction can be controlled by the number of the stacked dielectric films constituting the dielectric interference film 85. When the number of the stacked dielectric films is decreased, the transmission rate of the linear polarized light parallel with the reflection axis (the extension direction of the protrusions 82) is increased, and the reflection rate of the linear polarized light is decreased. When the dielectric films are stacked more than a predetermined number, however, almost all of the linear polarized light parallel with the reflection axis is reflected. In the reflective polarization layer 39 according to the fourth embodiment of the invention, the dielectric interference film 85 is adjusted such that approximately 70% of the linear polarized light parallel with the reflection axis is reflected, and the remainder of the linear polarized light, i.e., approximately 30% of the linear polarized light is transmitted.

Next, the operation of the liquid crystal device 200 will be described with reference to FIG. 20. The polarization panel 24, the liquid crystal layer 50, the reflective polarization layer 39, the polarization panel 14, and the back light 90, which are necessary for the following description of the operation of the liquid crystal device, are shown in FIG. 20 in order from the above.

First, the transmissive display (the transmission mode) shown in the right side of the FIG. 20 will be described.

In the liquid crystal device 200, the light emitted from the back light 90 is transmitted through the polarization panel 14, and is converted into a linear polarized light, which is parallel with the transmission axis 155 of the polarization panel 14. Subsequently, the linear polarized light is incident on the reflective polarization layer 39. A portion (approximately 30%) of the incident light, which is the linear polarized light parallel with the reflection axis (the optical axis perpendicular to the transmission axis 159) of the reflective polarization layer 39, is transmitted through the reflective polarization layer 39, and is incident on the liquid crystal layer 50. When the liquid crystal layer 50 is on (the selected voltage is applied between the pixel electrode 9 and the common electrode 69), the incident light is given a predetermined phase difference ($\lambda/2$) by the liquid crystal layer 50, and is converted into a linear polarized light, which is parallel with the transmission axis 153 of the polarization panel 24, whereby the light transmitted through the polarization panel 24 is recognized as a display light, and therefore, the corresponding dot is brightly displayed.

When the liquid crystal layer 50 is off (the selected voltage is not applied between the pixel electrode 9 and the common electrode 19), on the other hand, the light, which is transmitted through the reflective polarization layer 39 and is incident on the liquid crystal layer 50, reaches the polarization panel 24 while the polarized state of the incident light is maintained, and is absorbed into the polarization panel 24, which has an absorption axis (an optical axis perpendicular to the transmission axis 153) parallel with the incident light, whereby the corresponding dot is darkly displayed.

Furthermore, the light reflected by the reflective polarization layer 39, which is a portion of the light transmitted through the polarization panel 14 and reflected by the reflective polarization layer 39, is transmitted again through the polarization panel 14, and is then returned to the back light 90 side. The returned light is reflected by the reflective panel 92 of the back light 90, and is then directed again to the liquid crystal panel side such that the light is reused as an illumination light.

Next, the reflective display shown in the left side of the FIG. 20 will be described.

The light incident on the polarization panel 24 from the above (the outside) is transmitted through the polarization panel 24, and is converted into a linear polarized light, which is parallel with the transmission axis 153 of the polarization panel 24. Subsequently, the linear polarized light is incident on the liquid crystal layer 50. At this time, when the liquid crystal layer 50 is on, the incident light is given a predetermined phase difference ($\lambda/2$) by the liquid crystal layer 50, and is incident on the reflective polarization layer 39. As shown in FIG. 11B, the reflective polarization layer 39 has the transmission axis 159, which is parallel with the transmission axis 153 of the polarization panel 14, and the reflection axis, which is perpendicular to the transmission axis 153 of the polarization panel 14. Consequently, a portion (approximately 30%) of the light, which is transmitted through the liquid crystal layer 50, which is on, and is incident on the reflective polarization layer 39, is reflected while the polarized state of the light is maintained, and the remainder (approximately 70%) of the light is transmitted through the reflective polarization layer 39. The light, which is reflected by the reflective polarization layer 39 and is then incident on the liquid crystal layer 50 again, is returned to its polarized state at the time of incidence (the linear polarized light parallel with the transmission axis of the polarization panel 24) by the operation of the liquid crystal layer 50, and is then incident on the polarization panel 24, whereby the reflected light, which is transmitted through the polarization panel 24, is recognized as a display light, and therefore, the corresponding dot is brightly displayed.

On the other hand, the linear polarized light transmitted through the reflective polarization layer 39 is transmitted through the polarization panel 14, which has the transmission axis 155 parallel with the polarization direction thereof, and is then incident on the back light 90. The light incident on the back light 90 is reflected by the reflective panel 92, and is then returned to the liquid crystal layer 50 side. A portion of the light is transmitted through the reflective polarization layer 39, and is then incident on the liquid crystal layer 50 such that the light is used as a display light of the bright display. In the liquid crystal device 200 according to the fourth embodiment of the invention, although the reflection rate of the linear polarized light parallel with the reflection axis of the reflective polarization layer 39 is set to approximately 30%, the light transmitted through the reflective polarization layer 39 and returned to the back light 90 side is also used as the display light. Consequently, bright reflective display is possible.

When the liquid crystal layer 50 is off, on the other hand, the light incident on the liquid crystal layer 50 from the polarization panel 24 is incident on the reflective polarization layer 39 while the polarized state of the light is maintained, and is transmitted through the reflective polarization layer 39, which has the transmission axis 159 parallel with the light. Subsequently, the light is absorbed by the polarization panel 14, which has the absorption axis parallel with the light, whereby the corresponding dot is darkly displayed.

In the liquid crystal device 200 with the above-described construction, the reflective polarization layer 39, which is formed in the planar shape of a plane, is disposed at the substrate body 10A of the pixel electrode 9. As a result, it is not necessary to align the reflective polarization layer 39 with the sub-pixel region. Consequently, the liquid crystal device can be easily manufactured, and the manufacturing costs of the liquid crystal device are reduced. Also, when the reflective polarization layer 39 is located more closely to the substrate body 10A side than the semiconductor layer 35 according to the fourth embodiment of the invention, the pixel contact hole 46, by which the wire layer at which the semiconductor layer 35 is formed and the pixel electrode 9 are electrically connected to each other, can be shallowly formed, and electrical reliability of the conductive connection structure via the pixel contact hole 46 is improved. Furthermore, it is possible to reduce the diameter of the pixel contact hole 46, and therefore, disorder in orientation of the liquid crystal due to the pixel contact hole 46 can be prevented.

Also, the thickness of the liquid crystal layer 50 in the sub-pixel region is uniform in the same manner as the liquid crystal device according to the previously described first embodiment of the invention. Consequently, nonuniformity of the drive voltage in the sub-pixel region does not occur, and therefore, high-quality display is possible. Also, it is not necessary to form steps in the sub-pixel region as in the multi-gap structure. Consequently, disorder of the liquid crystal orientation due to the formation of such steps is prevented, and therefore, the reliability of the liquid crystal device is highly improved. Furthermore, the reflective polarization layer 39 for performing the reflective display is disposed on the TFT array substrate 10, and therefore, it is not necessary to dispose the TFT array substrate 10 at the display surface side of the liquid crystal device. Consequently, diffused reflection of the external light by the metal wires, which occurs when the TFT array substrate 10 is disposed at the display surface side of the liquid crystal device, is prevented, and therefore, the visibility of the liquid crystal device is highly increased.

According to the fourth embodiment of the invention, the common electrode 29, which serves to apply voltage to the liquid crystal together with the pixel electrode 9, is disposed on the reflective polarization layer 39. As previously described with reference to FIGS. 11A and 11B, the surface of the dielectric interference film 85 is covered by the resin layer such that the surface of the prism array 81 is even. A transparent conductive film, which is made of ITO, may be formed on the dielectric interference film instead of the resin layer. In this case, the transparent conductive film serves as the common electrode 29. As a result, the manufacturing efficiency is increased, and the manufacturing costs are decreased.

Furthermore, the common electrode 29 may be disposed such that the common electrode 29 is spaced apart from the pixel electrode 9 by an at least one-storied insulation film. For example, the common electrode may be formed either at the wire layer between the gate insulation film 11 and the second interlayer insulation film 13 or at the wire layer between the first interlayer insulation film 12 and the gate insulation film 11.

Fifth Embodiment

Now, a liquid crystal device according to a fifth embodiment of the invention will be described with reference to FIGS. 21 and 22.

Figure 21:
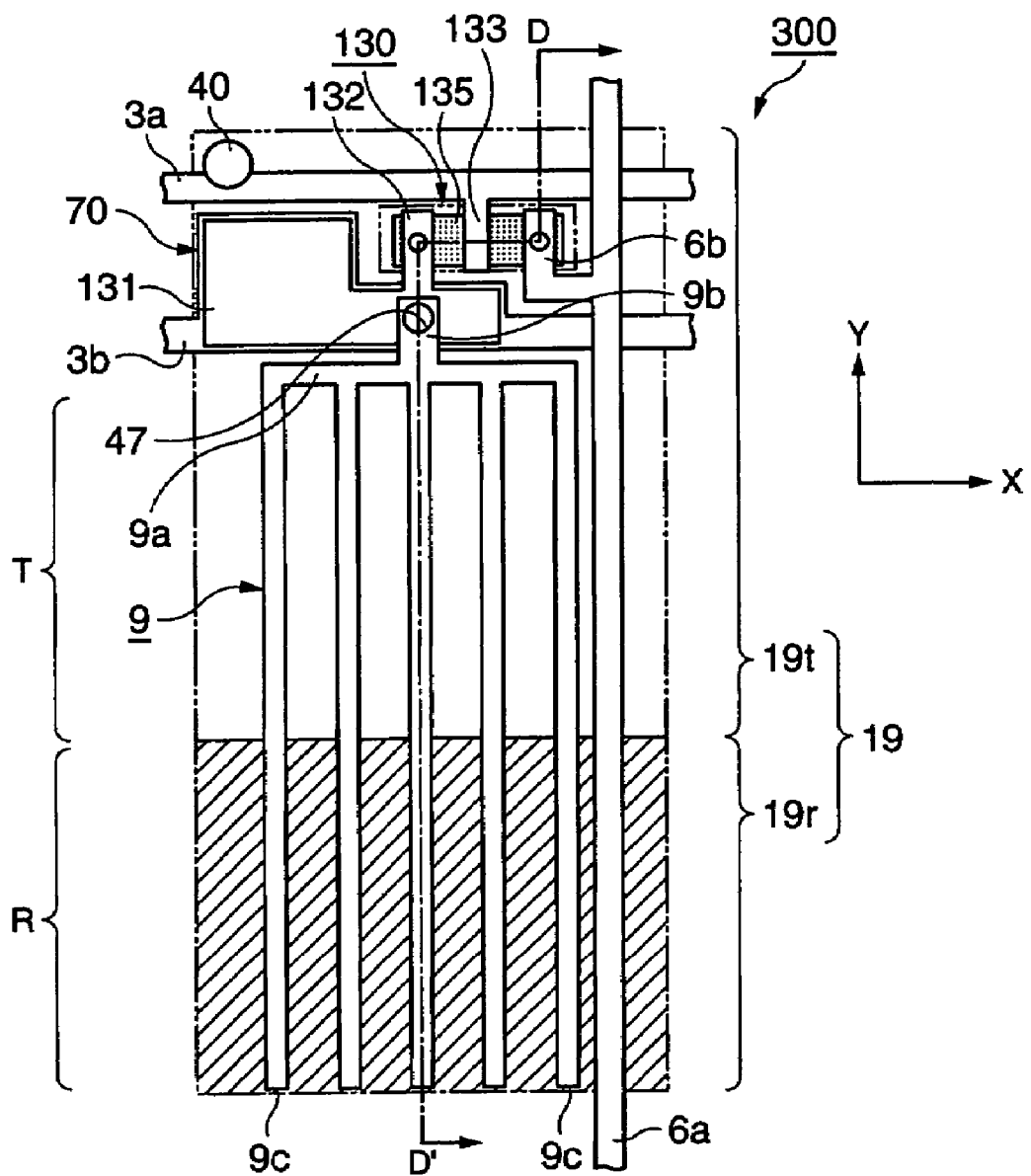
FIG. 21 is a plan view showing a sub-pixel region of a liquid crystal device according to a fifth embodiment of the invention.
Figure 22:
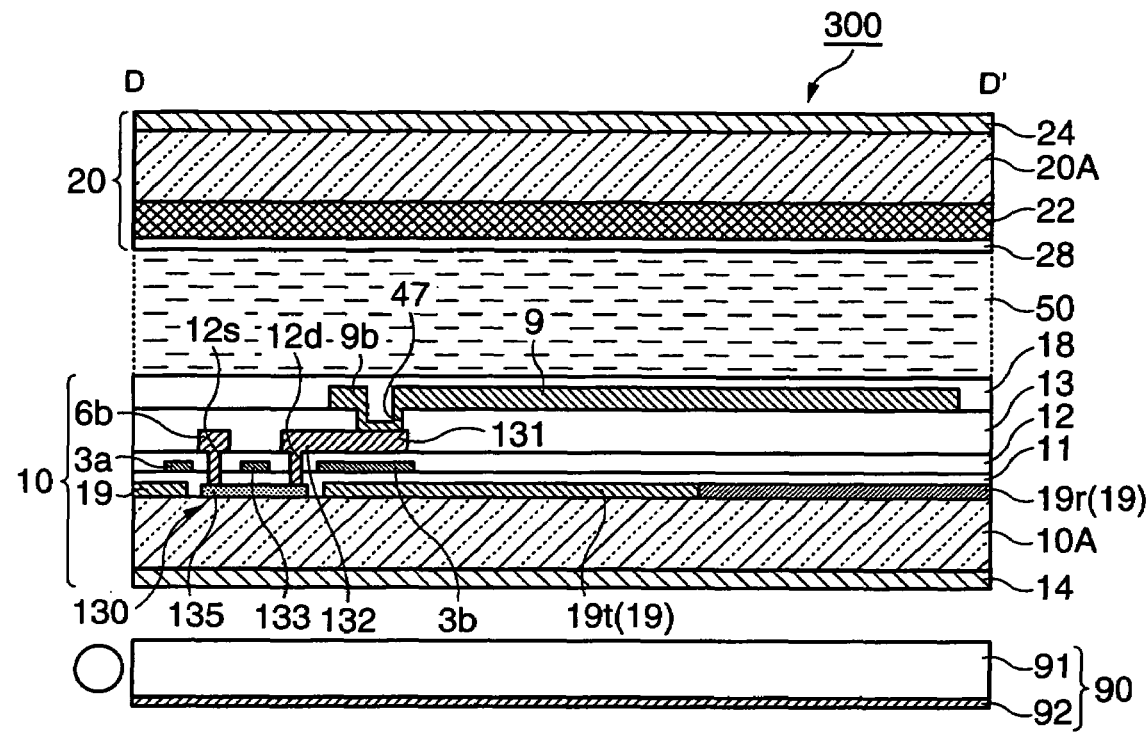
FIG. 22 is a sectional view taken along line D-D' of FIG. 21.

FIG. 21 is a plan view showing an arbitrary sub-pixel region of a liquid crystal device 300 according to a fifth embodiment of the invention, and FIG. 22 is a sectional view taken along line D-D' of FIG. 21.

The liquid crystal device 300 according to the fifth embodiment of the invention is a liquid crystal device that uses a top-gate type poly silicon TFT 130 instead of the amorphous silicon TFT 30 of the liquid crystal device 100 according to the first embodiment of the invention. The basic structure of the liquid crystal device 300 according to the fifth embodiment of the invention excluding the pixel switching element is identical to those of the liquid crystal devices 100 according to the first and third embodiments of the invention. FIG. 21 corresponds to FIG. 13A, with reference to which the liquid crystal device according to the third embodiment of the invention was previously described, and FIG. 22 corresponds to FIG. 14, with reference to which the liquid crystal device according to the third embodiment of the invention was also described. Consequently, in the respective drawings, with reference to which the liquid crystal device according to the fifth embodiment of the invention is described, components of the liquid crystal device according to the fifth embodiment of the invention, which are identical to those of the liquid crystal device 100 according to the third embodiment of the invention, are indicated by the same reference numerals as those of the liquid crystal device 100 according to the third embodiment of the invention, and a detailed description thereof will not be given.

As shown in FIG. 21, a pixel electrode (second electrode) 9, a common electrode (first electrode) 19, and a TFT 130, which is electrically connected to the pixel electrode 9 via a capacitor electrode 131, are disposed at the sub-pixel region of the liquid crystal device 300 according to the fifth embodiment of the invention.

A poly silicon semiconductor layer 135 constituting the TFT 130 is formed in the planar shape of a rectangle, which is elongated in the X-axis direction. A drain electrode 132, which extends from the capacitor electrode 131, is electrically connected to the −X side end of the semiconductor layer 135 via a drain contact hole. On the other hand, a source electrode 6b, which diverges from a data line 6a extending in the Y-axis direction, is electrically connected to the +X side end of the semiconductor layer 135 via a source contact hole.

In the vicinity of the semiconductor layer 135 is disposed a scanning line 3a, which extends in the X-axis direction. A gate electrode 133, which diverges from a portion of the scanning line 3a, is disposed such that the gate electrode 133 intersects the middle part of the semiconductor layer 135 in the Y-axis direction. Between the semiconductor layer 135 and the pixel electrode 9 is disposed a capacitor line 3b, which extends in the X-axis direction. The capacitor electrode 131 is disposed, such that the capacitor electrode 131 overlaps with the capacitor line 3b on the plane, at the region at which the width of a portion of the capacitor line 3b is increased to the +Y side. Also, an accumulation capacitor 70 is formed at the region at which the width of the capacitor line 3b is increased to the +Y side. On the capacitor electrode 131 is disposed a contact part 9b of the pixel electrode 9, which extends from the pixel electrode 9 to the capacitor electrode 131. At this position, the pixel electrode 9 and the capacitor electrode 131 are electrically connected to each other via a pixel contact hole 47.

In the same fashion as the previously described third embodiment of the invention, the common electrode 19 includes a transparent common electrode 19t, which is located at the +Y side of the sub-pixel region, and a reflective common electrode 19r, which is located at the −Y side of the sub-pixel region. The region at which the plane region of the transparent common electrode 19t overlaps with the plane region including the pixel electrode 9 is a transmissive display region T, and the region at which the plane region of the reflective common electrode 19r overlaps with the plane region including the pixel electrode 9 is a reflective display region R.

Referring to FIG. 22, the liquid crystal device 300 includes a TFT array substrate (first substrate) 10 and an opposite substrate (second substrate) 20, which is opposite to the TFT array substrate 10 while a liquid crystal layer 50 is disposed between the TFT array substrate 10 and the opposite substrate 20. At the rear surface of the TFT array substrate 10 (the lower surface in the drawing) is disposed a back light 90. The structure of the opposite substrate 20 is identical to that of the third embodiment of the invention. Consequently, a detailed description of the structure of the opposite substrate 20 will not be given.

The transparent common electrode 19t, which is made of a transparent conductive material, such as ITO, and the reflective common electrode 19r, which is mainly made of a reflective metal film, such as aluminum, on a substrate body 10A of the TFT array substrate 10 while the transparent common electrode 19t and the reflective common electrode 19r are separated from each other. The semiconductor layer 135, which is made of a poly silicon film, is disposed in an opening formed by partially removing the transparent common electrode 19t.

The semiconductor layer 135 and the common electrode 19 are covered to form a gate insulation film 11. The scanning line 3a, the gate electrode 133, and the capacitor line 3b are formed on the gate insulation film 11. The scanning line 3a, the gate electrode 133, and the capacitor line 3b are covered to form a first interlayer insulation film 12 on the gate insulation film 11. The source electrode 6b (the data line 6a), the drain electrode 132, and the capacitor electrode 131 are formed on the first interlayer insulation film 12. Through the first interlayer insulation film 12 and the gate insulation film 11 are formed a source contact hole 12a and a drain contact hole 12d, which extend to the semiconductor layer 135. The source electrode 6b and the semiconductor layer 135 are electrically connected to each other via the source contact hole 12a. The drain electrode 132 and the semiconductor layer 135 are electrically connected to each other via the drain contact hole 12d.

A dopant, such as phosphorus or boron, is injected into the region of a poly silicon film constituting the semiconductor layer 135, excluding the region at which the semiconductor layer 135 overlaps with the gate electrode 133 on the plane (a channel region). The source electrode 6b and the drain electrode 132 are electrically connected to each other at the dopant injection region.

The source electrode 6b, the drain electrode 132, and the capacitor electrode 131 are covered to form a second interlayer insulation film 13. The pixel electrode 9 is formed on the second interlayer insulation film 13. The pixel contact hole 47 is formed through the second interlayer insulation film 13 such that the pixel contact hole 47 extends to the capacitor electrode 131. The contact part 9b of the pixel electrode 9 and the capacitor electrode 131 are electrically connected to each other via the pixel contact hole 47. On the pixel electrode 9 is formed an orientation film 18.

Furthermore, the optical axes of the liquid crystal device 300 according to the fifth embodiment of the invention are arranged in the same manner as the liquid crystal device 100 according to the third embodiment of the invention. Specifically, the rubbing direction of the orientation films 18 and 28 is located at an angle of approximately 30 degrees to the extension direction of the pixel electrode parts 9c (the Y-axis direction), and the transmission axis of the reflective common electrode 19r is parallel with the rubbing direction of the orientation films 18 and 28. Also, the transmission axis of a polarization panel 14 of the TFT array substrate 10 is perpendicular to the rubbing direction of the orientation films 18 and 28, and the transmission axis of a polarization panel 24 of the opposite substrate 20 is parallel with the rubbing direction of the orientation films 18 and 28.

The liquid crystal device 300 with the above-described arrangement of the optical axes is operated in the same manner as the liquid crystal device 100 according to the third embodiment of the invention previously described with reference to FIG. 16. Consequently, high-contrast display is accomplished in both the reflective display and the transmissive display.

The liquid crystal device 300 with the above-stated construction according to the fifth embodiment of the invention uses the poly silicon TFT 130, which has high carrier mobility and can be operated at high speed, as the pixel switching element. Consequently, the invention can be easily applied to a high-definition liquid crystal device requiring the high-speed switching operation of the pixel. Also, the liquid crystal device according to the fifth embodiment of the invention uses the top-gate type TFT 130. As a result, as shown in FIG. 22, the common electrode 19 can be disposed at the same level as the semiconductor layer 135, and it is possible to construct the FFS mode liquid crystal device while using the same layer structure as the TFT array substrate having no common electrode 19. Consequently, the liquid crystal device can be manufactured without addition of a new wire layer, and therefore, the manufacturing process is simplified with the reduction of the manufacturing costs.

Also, the thickness of the liquid crystal layer 50 in the sub-pixel region is uniform in the same manner as the liquid crystal devices according to the previously described third and fourth embodiments of the invention. Consequently, non-uniformity of the drive voltage in the sub-pixel region does not occur, and therefore, high-quality display is possible. Also, it is not necessary to form steps in the sub-pixel region as in the multi-gap structure. Consequently, disorder of the liquid crystal orientation due to the formation of such steps is prevented, and therefore, the reliability of the liquid crystal device is highly improved. Furthermore, the reflective common electrode 19r for performing the reflective display is disposed on the TFT array substrate 10, and therefore, it is not necessary to dispose the TFT array substrate 10 at the display surface side of the liquid crystal device. Consequently, diffused reflection of the external light by the metal wires, which occurs when the TFT array substrate 10 is disposed at the display surface side of the liquid crystal device, is prevented, and therefore, the visibility of the liquid crystal device is highly increased.

Sixth Embodiment

Now, a liquid crystal device according to a sixth embodiment of the invention will be described with reference to FIGS. 23 to 25.

Figure 23:
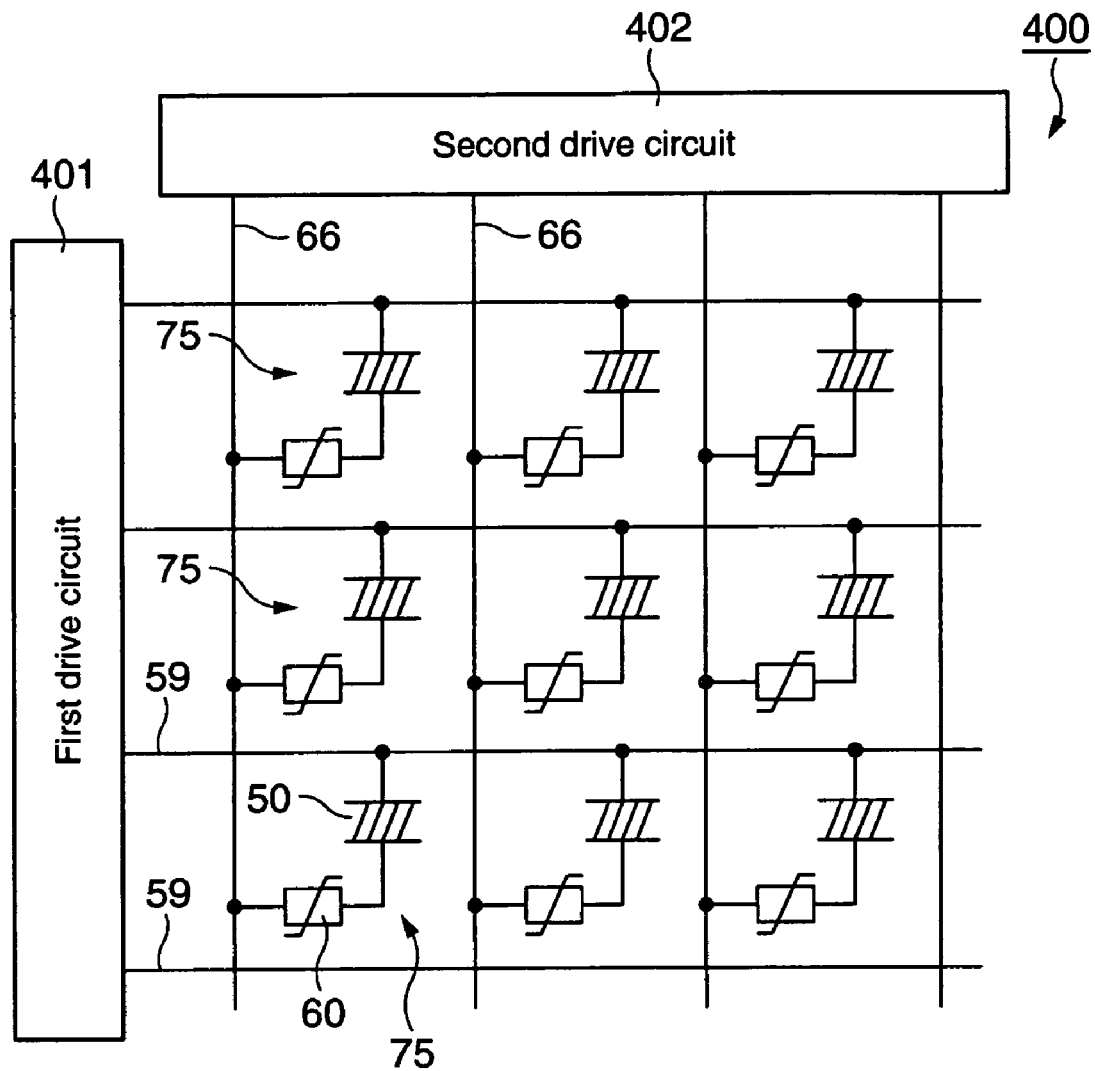
FIG. 23 is a circuit diagram of a liquid crystal device according to a sixth embodiment of the invention.

FIG. 23 is a circuit diagram of a liquid crystal device 400 according to a sixth embodiment of the invention. FIG. 24 is a plan view showing a sub-pixel region of the liquid crystal device 400 according to the sixth embodiment of the invention, and FIG. 25 is a sectional view taken along line F-F' of FIG. 24.

The liquid crystal device 400 according to the sixth embodiment of the invention is an active matrix type liquid crystal device using thin film diode (TFD) elements as the pixel switching elements. Also, the liquid crystal device 400 according to the sixth embodiment of the invention has an FFS mode electrode structure as in the liquid crystal devices according to the first to third embodiments of the invention, and the basic structure of the liquid crystal device 400 according to the sixth embodiment of the invention excluding the pixel switching elements is identical to those of the liquid crystal devices according to the third to fifth embodiments of the invention. In the drawings, with reference to which the liquid crystal device according to the sixth embodiment of the invention will be described, components of the liquid crystal device 400 according to the sixth embodiment of the invention, which are identical to those of the liquid crystal device 100 according to the third embodiment of the invention shown in FIGS. 13A to 16, are indicated by the same reference numerals as those of the liquid crystal device 100 according to the third embodiment of the invention, and a detailed description thereof will not be given.

As shown in FIG. 23, the liquid crystal device 400 includes a plurality of dots 75 arranged in the planar shape of a matrix.

A plurality of first wires 59 and a plurality of second wires 66 extend to divide the dots. Also, the liquid crystal device 400 includes a first drive circuit 401 and a second drive circuit 402. The first wires 59 are electrically connected to the first drive circuit 401, and the second wires 66 are electrically connected to the second drive circuit 402. Consequently, drive signals from the first drive circuit 401 and the second drive circuit 402 are supplied to the respective dots 75 via the first wires 59 and the second wires 66. Each of the dots 75 includes a TFD element 60 and a liquid crystal display element (liquid crystal capacitor) 50, which are formed between the second wires 66 and the first wires 59.

Figure 24:
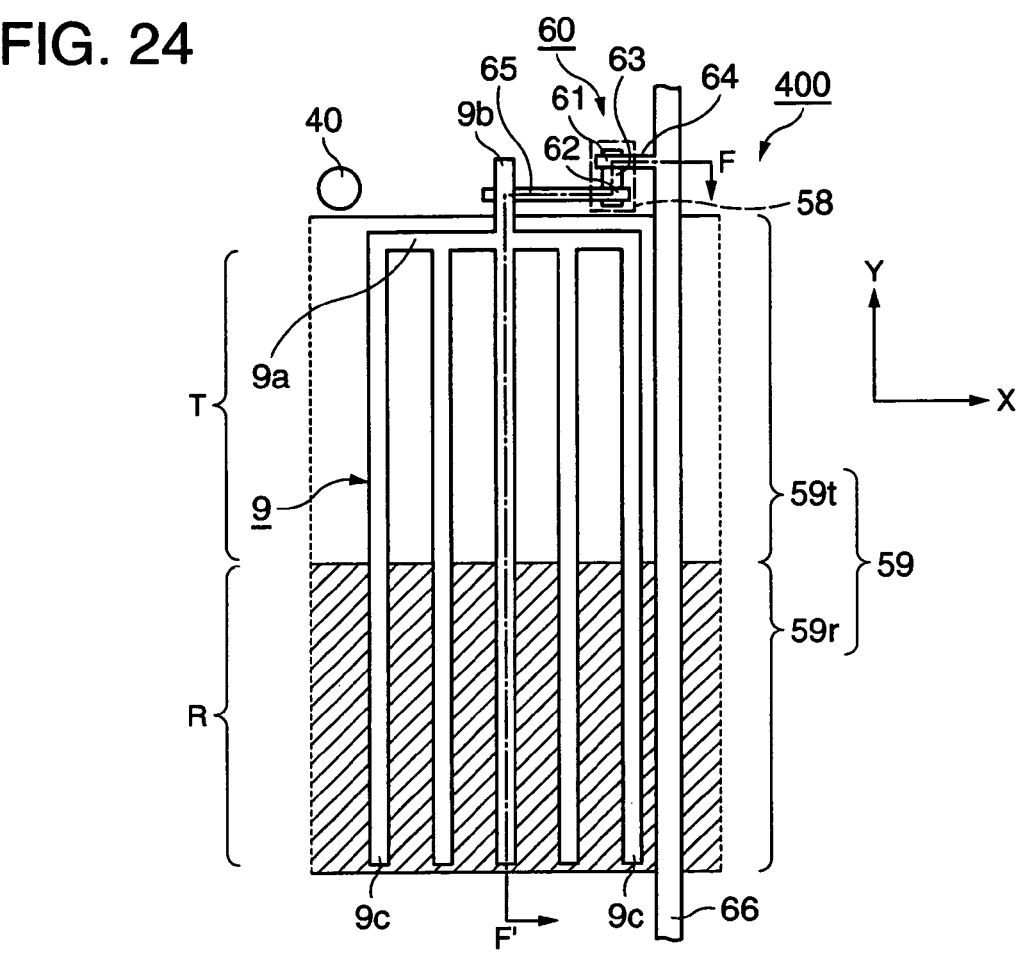
FIG. 24 is a plan view showing a sub-pixel region of the liquid crystal device according to the sixth embodiment of the invention.

As shown in FIG. 24, a pixel electrode (second electrode) 9, a common electrode (first electrode) 59, and the TFT element 60 are disposed at the sub-pixel region of the liquid crystal device 400. The common electrode (first wire) 59 is a band-shaped conductive film, which extends in the X-axis direction, and an element wire (second wire) 66, which intersects the common electrode 59 and extends in the Y-axis direction, is disposed along the edge of the pixel electrode 9.

The TFD element 60 mainly includes a first electrode 63, which is formed in the shape of a rectangle elongated in the Y-axis direction, a wire branch 64, which diverges from the element wire 66 and extends to the −X side, and an electrode wire 65, which extends along a base end part 9a of the pixel electrode 9 in the X-axis direction. The TFD element 60 further includes a first element part 61, which is formed at the intersection between the first electrode 63 and the wire branch 64, and a second element part 62, which is formed at the intersection between the first electrode 63 and the electrode wire 65. The first element part 61 and the second element part 62 are connected to each other back to back (in electrically opposite directions). In other words, the TFD element 60 is constructed in a back-to-back structure.

The end of the electrode wire 65 at the side thereof opposite to the TFD element 60 intersects a contact part 9b of the pixel electrode 9 such that the end of the electrode wire 65 is electrically connected to the pixel electrode 9. As a result, the TFD element 60 is disposed between the element wire 66 and the pixel electrode 9. Also, a columnar spacer 40 is mounted in the sub-pixel region.

Figure 25:
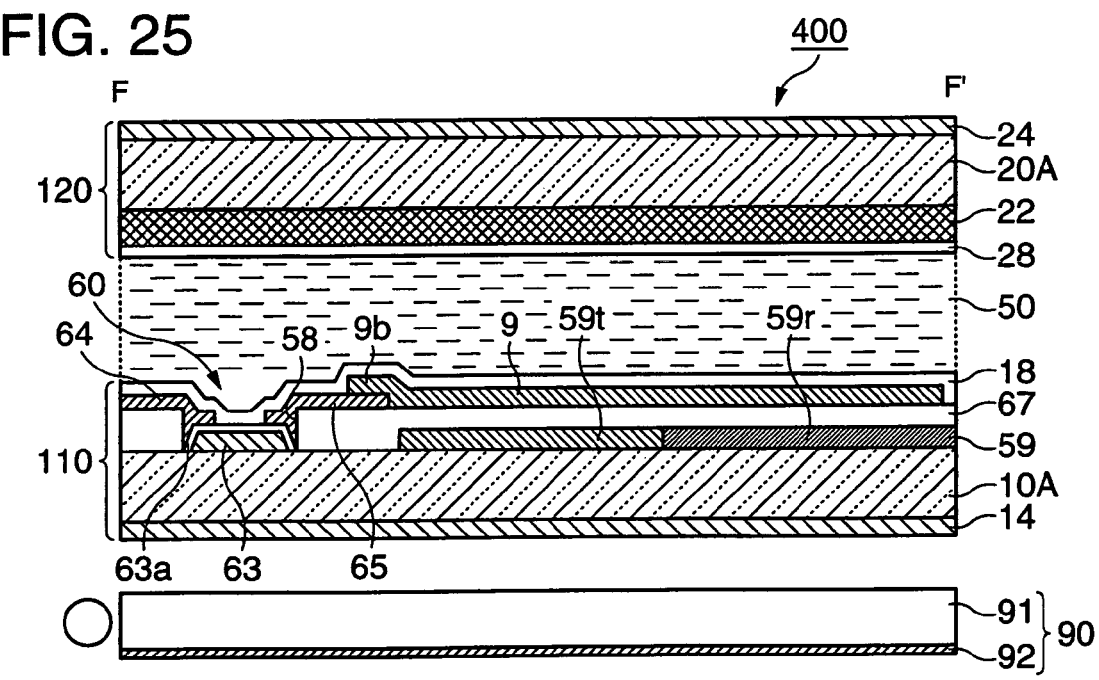
FIG. 25 is a sectional view taken along line F-F' of FIG. 24.

Referring to FIG. 25, the liquid crystal device 400 includes an element substrate (first substrate) 110 and an opposite substrate (second substrate) 120, which is opposite to the element substrate 110 while a liquid crystal layer 50 is disposed between the element substrate 110 and the opposite substrate 120. The structure of the opposite substrate 120 is identical to that of the opposite substrate 20 according to the third embodiment of the invention. Consequently, a detailed description of the structure of the opposite substrate 20 will not be given.

The element substrate 110 includes a light-transmissive substrate body 10A, which is made of glass or quartz. The first electrode 63, which is made of tantalum or tantalum alloy, and the common electrode 59 are formed on the substrate body 10A. The surface of the first electrode 63 is covered by an element insulation film 63a, which is made of a tantalum oxide film, for example. The common electrode 59 includes a transparent common electrode 59t, which is made of a transparent conductive material, such as ITO, and a reflective common electrode 59r, which is mainly made of a light-reflective metal film, such as aluminum. The transparent common electrode 59t and the reflective common electrode 59r are separated from each other in the sub-pixel region. The reflective common electrode 59r is a reflective polarization film having the same structure as the reflective common electrode 194 according to the first embodiment of the invention.

On the substrate body 10A and the common electrode 59 is formed an interlayer insulation film 67, which is made of an inorganic insulation material, such as silicon oxide, or a resin material, such as acryl. The first electrode 63 is disposed in an opening 58 formed through the interlayer insulation film 67. The wire branch 64 (the element wire 66), the electrode wire 65, and the pixel electrode 9 are formed on the interlayer insulation film 67. One end of the wire branch 64 and one end of the electrode wire 65 extend from the top of the interlayer insulation film 67 into opening 58 such that the ends of the wire branch 64 and the electrode wire 65 are brought into contact with the element insulation film 63a. A metal-insulation-metal (MIM) structure of the first element part 61 and the second element part 62 is formed at the contact position. The pixel electrode 9, the wire branch 64, and the electrode wire 65 are covered to form an orientation film 18.

Furthermore, the arrangement of optical axes in the liquid crystal device 400 according to the sixth embodiment of the invention is identical to that of the optical axes in the liquid crystal device 100 according to the third embodiment of the invention shown in FIG. 13B. Specifically, the rubbing direction of the orientation films 18 and 28 is located at an angle of approximately 30 degrees to the extension direction of the pixel electrode parts 9c (the Y-axis direction), and the transmission axis of the reflective common electrode 59r is parallel with the rubbing direction of the orientation films 18 and 28. Also, the transmission axis of a polarization panel 14 of the element substrate 110 is perpendicular to the rubbing direction of the orientation films 18 and 28, and the transmission axis of a polarization panel 24 of the opposite substrate 120 is parallel with the rubbing direction of the orientation films 18 and 28.

The liquid crystal device 400 with the above-described arrangement of the optical axes is operated in the same manner as the liquid crystal device 100 according to the third embodiment of the invention previously described with reference to FIG. 16. Consequently, high-contrast display is accomplished in both the reflective display and the transmissive display.

The liquid crystal device 400 with the above-stated construction uses the TFD elements as the pixel switching elements. Consequently, the liquid crystal device can be easily manufactured, and the manufacturing costs of the liquid crystal device are reduced. Also, the opening rate of the pixel is increased to the extent that the provision of the maintenance capacitor is not necessary, and therefore, bright display is accomplished. Furthermore, when the FFS mode is adopted as in the liquid crystal device 400 according to the sixth embodiment of the invention, the pixel electrode 9 and the common electrode 59 are opposite to each other via the insulation film in the thickness direction of the substrate. Consequently, the opposite region serves as the maintenance capacitor, the voltage of the pixel electrode 9 is easily maintained, and therefore, the invention can be easily applied to a high-definition liquid crystal device having small liquid crystal capacitors.

Also, the thickness of the liquid crystal layer 50 is in the sub-pixel region uniform in the same manner as the liquid crystal devices according to the previously described third to fifth embodiments of the invention. Consequently, nonuniformity of the drive voltage in the sub-pixel region does not occur, and therefore, high-quality display is possible. Also, it is not necessary to form steps in the sub-pixel region as in the multi-gap structure. Consequently, disorder of the liquid crystal orientation due to the formation of such steps is prevented, and therefore, the reliability of the liquid crystal device is highly improved. Furthermore, the reflective common electrode 59r for performing the reflective display is disposed on the element substrate 110, and therefore, it is not necessary to dispose the element substrate 110 at the display surface side of the liquid crystal device. Consequently, diffused reflection of the external light by the metal wires, which occurs when the element substrate 110 is disposed at the display surface side of the liquid crystal device, is prevented, and therefore, the visibility of the liquid crystal device is highly increased.

Electronic Equipment

Figure 26:
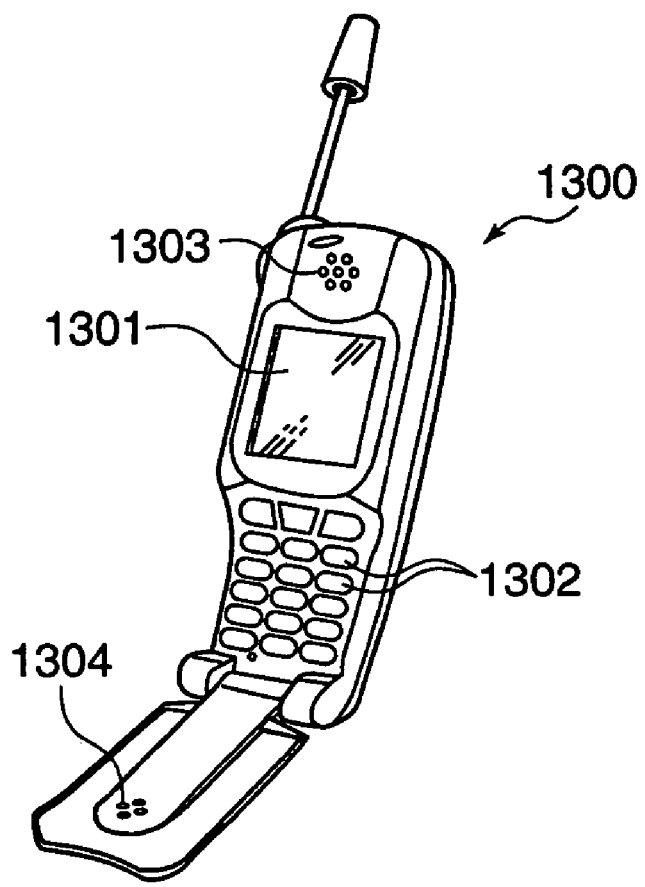
FIG. 26 is a perspective view showing electronic equipment according to an embodiment of the invention.

FIG. 26 is a perspective view showing a mobile phone 1300, which is an example of electronic equipment having a liquid crystal device according to the invention mounted at a display part thereof. The mobile phone 1300 includes a small-sized display part 1301, to which the liquid crystal device according to the invention is mounted, a plurality of operation buttons 1302, a receiver part 1303, and a transmitter part 1304.

The liquid crystal device according to the invention is not limited to the above-described mobile phone. For example, the liquid crystal device according to the invention can be appropriately applied to electronic books, personal computers, digital still cameras, liquid crystal televisions, viewfinder type or monitor type video tape recorders, car navigation systems, pagers, electronic notebooks, electronic calculators, word processors, workstations, videophones, POS terminals, and equipment having touch panels, as the picture display unit. Furthermore, the liquid crystal device according to the invention is capable of accomplishing high-brightness, high-contrast, wide view angle transmissive display and reflective display for any electronic equipment.

The entire disclosure of Japanese Patent Application Nos. 2005-090720, filed Mar. 28, 2005, and 2005-090721, filed Mar. 28, 2005, are expressly incorporated by reference herein.

What is claimed is:

1. A semi-transmissive reflective liquid crystal device comprising:
   a first substrate;
   a second substrate disposed opposite to the first substrate;
   a liquid crystal layer disposed between the first substrate and the second substrate;
   a plurality of sub-pixel regions at which reflective display and transmissive display are performed, each of the sub-pixel regions being the smallest display unit;
   a first electrode and a second electrode disposed in each of the sub-pixel regions at the liquid crystal layer side of the first substrate for driving the liquid crystal layer by an electric field generated between the first electrode and the second electrode; and
   a reflective polarization layer disposed at the first substrate or the second substrate, the reflective polarization layer including a transmission axis and a reflection axis perpendicular to the transmission axis, the reflective polarization layer reflecting a portion of incident light that a polarized parallel with the reflection axis and transmitting a remainder of the incident light that is a polarized parallel with the transmission axis.

2. The device according to claim 1, wherein the reflective polarization layer is partially formed in each of the sub-pixel regions.

3. The device according to claim 1, wherein the reflective polarization layer is almost wholly formed in each of the sub-pixel regions.

4. The device according to claim 1, wherein the reflective polarization layer includes a metal reflective film having a plurality of openings, which are formed in the shape of a minute slit.

5. The device according to claim 1, wherein the reflective polarization layer includes a prism array, which is formed by arranging a plurality of prisms, and a dielectric interference film, which is formed on the prism array.

6. The device according to claim 1, wherein the liquid crystal layer has a thickness approximately uniform in the sub-pixel regions.

7. The device according to claim 1, wherein the reflective polarization layer is disposed at the second substrate.

8. The device according to claim 7, wherein
   the first electrode and the second electrode include pluralities of band-shaped electrodes extending in each of the sub-pixel regions, respectively, and
   the band-shaped electrodes of the first electrode and the band-shaped electrodes of the second electrode are alternately arranged in each of the sub-pixel regions.

9. The device according to claim 7, further comprising:
   a polarization panel disposed at the surface of the second substrate at the side opposite to the reflective polarization layer, wherein
   the polarization panel has a transmission axis, and the reflective polarization layer has a transmission axis, the transmission axis of the polarization panel being approximately parallel with the transmission axis of the reflective polarization layer.

10. The device according to claim 9, wherein
    the band-shaped electrodes of the first electrode and the band-shaped electrodes of the second electrode are approximately parallel with each other, and
    the extension direction of the band-shaped electrodes intersects the transmission axis of the reflective polarization layer.

11. The device according to claim 10, wherein the angle between extension direction of the band-shaped electrodes and the transmission axis of the reflective polarization layer is approximately 30 degrees.

12. The device according to claim 1, further comprising:
    a color filter disposed on the reflective polarization layer of the second substrate.

13. The device according to claim 12, further comprising:
    an insulation film formed between the color filter and the liquid crystal layer.

14. The device according to claim 7, further comprising:
    a light unit disposed at the outer surface side of the second substrate.

15. The device according to claim 1, wherein the first electrode, an interlayer insulation film, which covers the first electrode, the second electrode, which is formed on the interlayer insulation film, and the reflective polarization layer are disposed at the liquid crystal layer side of the first substrate.

16. The device according to claim 15, wherein the reflective polarization layer is electrically connected to the first electrode.

17. The device according to claim 15, further comprising:
    a light unit disposed at the outer surface side of the first substrate.

18. The device according to claim 17, further comprising:
a polarization panel disposed between the first substrate and the lighting unit, wherein
the polarization panel has a transmission axis, and the reflective polarization layer has a transmission axis, the transmission axis of the polarization panel being approximately perpendicular to the transmission axis of the reflective polarization layer.

19. The device according to claim 15, further comprising:
a color filter disposed at the liquid crystal layer side of the second substrate.

20. Electronic equipment comprising the liquid crystal device according to claim 1.

* * * * *